(12) United States Patent
Liu et al.

(10) Patent No.: US 8,955,392 B2
(45) Date of Patent: Feb. 17, 2015

(54) ULTRASONIC FLOWMETER WITH INTEGRALLY FORMED ACOUSTIC NOISE ATTENUATING FEATURE

(71) Applicant: Strain Measurement Devices, Inc., Wallingford, CT (US)

(72) Inventors: Lingli Liu, Cheshire, CT (US); Samuel A. Matus, Plainville, CT (US); Frederick E. Jackson, Durham, CT (US)

(73) Assignee: Strain Measurement Devices, Inc., Wallingford, CT (US)

( * ) Notice: Subject to any disclaimer, the term of this patent is extended or adjusted under 35 U.S.C. 154(b) by 146 days.

(21) Appl. No.: 13/834,881

(22) Filed: Mar. 15, 2013

(65) Prior Publication Data

US 2014/0260668 A1    Sep. 18, 2014

(51) Int. Cl.
   *G01F 1/66* (2006.01)
(52) U.S. Cl.
   CPC ..................................... *G01F 1/66* (2013.01)
   USPC ..................................................... 73/861.28
(58) Field of Classification Search
   USPC ............... 73/861.25, 861.27–861.29
   See application file for complete search history.

(56) References Cited

U.S. PATENT DOCUMENTS

| | | | | |
|---|---|---|---|---|
| 5,515,733 | A * | 5/1996 | Lynnworth | 73/861.27 |
| 5,969,263 | A * | 10/1999 | Ligneul et al. | 73/861.25 |
| 6,026,693 | A * | 2/2000 | Baumoel et al. | 73/861.27 |
| 6,490,933 | B2 | 12/2002 | Koyano et al. | |
| 6,526,838 | B1 * | 3/2003 | Froelich et al. | 73/861.28 |
| 6,626,049 | B1 * | 9/2003 | Ao | 73/861.29 |
| 7,624,651 | B2 | 12/2009 | Fernald et al. | |
| 7,963,177 | B2 | 6/2011 | Gysling | |

* cited by examiner

*Primary Examiner* — Jewel V Thompson
(74) *Attorney, Agent, or Firm* — Cantor Colburn LLP

(57) ABSTRACT

A flowmeter has a one-piece conduit with an outer surface and an inner surface that define a wall thickness therebetween, and first and second transducers, where each transducer is disposed external of or integral with the one-piece conduit, in signal communication with an interior volume of the one-piece conduit, and relative to each other such that each transducer can send and receive an acoustic signal to the other transducer. The one-piece conduit includes a plurality of acoustic noise attenuating features integrally formed with at least one of the outer surface and the inner surface and disposed between the first and second transducers, each of the features being configured and oriented to disturb a propagation direction of a parasitic acoustic wave that will propagate in the wall of the one-piece conduit in response to activation of at least one of the transducers.

38 Claims, 19 Drawing Sheets

ULTRASONIC FLOWMETER WITH INTEGRALLY FORMED ACOUSTIC NOISE ATTENUATING FEATURE

BACKGROUND OF THE INVENTION

The present disclosure relates generally to a flowmeter, particularly to an ultrasonic flowmeter, and more particularly to an ultrasonic flow meter with acoustic noise attenuating features integrally formed with a one-piece conduit of the flowmeter.

Ultrasonic flowmeters use ultrasonic techniques, such as ultrasonic transit time techniques, ultrasonic phase shift techniques, and/or ultrasonic sing-around techniques, for example, to measure fluid flow and take other fluid measurements, including flow velocity, flow rate, Reynolds Number, and acoustic speed of the fluid, for example. Ultrasonic flowmeters using ultrasonic techniques may be used for blood flow measurement in an extracorporeal tube, or water flow in plastic, glass or steel pipes, for example. Such fluid flow measurements can be employed for all fluids, including liquids and gases, as well as suspensions, slurries, and multiphase flowable materials.

There are generally two types of ultrasonic flowmeters, which are herein referred to as type-1 and type-2 flowmeters. In a type-1 flowmeter 100 as depicted in FIG. 1, one pair or several pairs of ultrasonic transducers 104, 106 are clamped, installed or fitted on a flowmeter body 102, which is usually composed of a large pipe disposed between connecting structures on each end, such as a flange or a pipe fitting. In the embodiment of FIG. 1, pipe clamps 108 (with adjustment screws hidden from view) may be used to hold the transducers 104, 106 in acoustic signal communication with the body 102 by engaging flanges 110 of mounting blocks 112, to which the transducers 104, 106 are fitted, thereby securing the flanges 110 and mounting blocks 112, along with the transducers 104, 106, to the body 102. By loosening the pipe clamps 108, an operator in the field can adjust the axial and circumferential positioning of the transducers 104, 106 relative to the body 102. The ultrasonic transducers may have piezoelectric crystals in the transducer housings to transmit and receive ultrasonic signals. The ultrasonic transducers can be capacitive micro-machined ultrasonic transducers (CMUTs), piezocomposites, or other piezoelectric materials. In an embodiment the transducers 104, 106 of the type-1 flowmeter 100 are mounted in pairs on the flowmeter body 102 opposite each other, one upstream and another downstream. The paired transducers 104, 106 transmit and receive ultrasonic signals alternately in a diagonal manner through the fluid in the pipe. The differences in ultrasound propagation time or ultrasonic wave phases between upstream and downstream received signals are proportional to the flow velocity.

Liquid flows through the pipe body 102 and the flow characteristics and fluid properties are measured by exciting the transducers and comparing the time differences or phase shifts between received signals. The transducers are typically attached to the coupling wedges permanently and the coupling block will direct the ultrasonic waves through the pipe walls and the fluid. Coupling materials like gel or grease can be applied between the coupling wedge and the pipe wall to improve the signal transmission. In certain applications, instead of clamp-on transducers, the ultrasonic transducer can be permanently mounted in the pipe wall or a "wetted" transducer mounted through the pipe wall can be used to improve the signal strength.

In a type-2 flowmeter 200 as depicted in FIG. 2, a pair of ultrasonic transducers 204, 206 are clamped, installed or fitted on respective ends of a "U-shaped" or "Z-shaped" tube section 202. FIG. 2 shows a "U-shaped" tube section where the legs 201 may be straight (depicted by solid lines) or angled (depicted by dashed lines), and FIG. 3 shows a "Z-shaped" tube section where the legs 203 may be straight (depicted by solid lines) or angled (depicted by dashed lines). In an embodiment the transducers can be acoustically coupled to the ends of the measurement section, or they can have direct contact with the fluid, which is referred to as a wetted transducer. Operation of the type-2 flowmeter 200 is similar to that of the type-1 flowmeter 100. The geometry of a type-2 flowmeter 200 may cause a slight pressure drop at the location where the flow direction is changed.

Accurate measurement of transit time differences or phase shifts depends to a large degree on the signal to noise ratio (SNR) of the downstream and upstream received ultrasonic signals. The higher the SNR, the better the accuracy that can be achieved. Multiple methods have been employed in prior art devices to improve the SNR, such as increasing the driving voltage on the transmitter and adding filtering circuits to the receiver, for example. These methods help distinguish the ultrasonic signal that carries the flow information from random background noise.

In some situations, the ultrasound wave propagates not only through the fluid but also through the conduit wall. If the conduit portion of the ultrasound wave arrives at the receiving transducer close to the same time as the fluid portion of the ultrasound wave, the conduit portion of the ultrasonic wave may interfere with the fluid portion of the ultrasonic wave, which carries the transit time and/or phase difference information of interest, increasing the magnitude of errors in flow measurements of the fluid itself.

U.S. Pat. No. 5,969,263 discloses the placement of absorbing materials inside a gas flow chamber to absorb or attenuate the parasitic ultrasonic noise generated by pressure regulators. However, this method requires the addition of such absorbing materials into the flowmeter, which is not feasible for most non-invasive measurements and liquid flowmeters.

U.S. Pat. No. 6,490,933 discloses the external attachment of a separate acoustic filter to a measurement tube to cut high frequency noises propagating through the oscillating tube. Such external attachments are not desirable in many applications, as they require more space and assembly, and they introduce a discontinuous boundary layer between the fluid conduit and the externally attached noise attenuating features that may deflect acoustic waves back into the conduit wall thereby reducing the overall efficiency of the noise attenuating features. Furthermore, a separately attached acoustic filter is typically designed as a frequency cut-off filter having filtering characteristics that must be matched to the vibrational characteristics of the structure of the oscillating tube that it is attached to.

U.S. Pat. No. 7,624,651 discloses an apparatus for attenuating acoustic waves in a pipe wall for a clamp-on ultrasonic flowmeter that employs a housing mounted to the flow pipe, the mounted housing providing multiple impedance changes, via viscoelastic damping material embedded within slots in the housing, which serves to dissipate vibrational energy in the pipe wall. Such external attachments are not desirable in many applications, as they require more space and assembly, and they introduce a discontinuous boundary layer between the fluid conduit and the externally attached noise attenuating features that may deflect acoustic waves back into the conduit wall thereby reducing the overall efficiency of the noise attenuating features. Furthermore, a separately mounted damping housing is typically designed to match the vibrational characteristics of the structure of the flow pipe that it is attached to.

U.S. Pat. No. 7,963,177 discloses an apparatus for attenuating ultrasonic waves propagating within a pipe wall of an ultrasonic flowmeter that employs a clamped-on damping device having tines that are mounted to panels where the tines are tuned to avoid frequency resonance and to dissipate high frequency energy in the pipe wall. Such external attachments are not desirable in many applications, as they require more space and assembly, and they introduce a discontinuous boundary layer between the fluid conduit and the externally attached noise attenuating features that may deflect acoustic waves back into the conduit wall thereby reducing the overall efficiency of the noise attenuating features. Furthermore, a separately attached acoustically tuned damping device is typically designed as a frequency resonance or frequency cut-off filter having filtering characteristics that must be matched to the vibrational characteristics of the structure of the pipe that it is attached to.

While existing ultrasonic flowmeter damping devices may be suitable for their intended purpose, the art of ultrasonic flowmeters can be advanced with an improved apparatus that reduces the parasitic ultrasonic noise propagating through the ultrasonic flowmeter conduit wall without the foregoing disadvantages.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention includes a flowmeter with a one-piece conduit having an outer surface and an inner surface that define a wall thickness therebetween, and first and second transducers, where each transducer is disposed external of or integral with the one-piece conduit, in signal communication with an interior volume of the one-piece conduit, and relative to each other such that each transducer can send and receive an acoustic signal to the other transducer. The one-piece conduit includes a plurality of acoustic noise attenuating features integrally formed with at least one of the outer surface and the inner surface and disposed between the first and second transducers, each of the features being configured and oriented to disturb a propagation direction of a parasitic acoustic wave that will propagate in the wall of the one-piece conduit in response to activation of at least one of the transducers.

An embodiment of the invention includes the aforementioned flowmeter made by the process of: forming the one-piece conduit from a material having an uninterrupted material path from the outer surface to the inner surface; and acoustically fitting the first and second transducers to the outer surface of or integral with the outer surface of the one-piece conduit.

An embodiment of the invention includes the aforementioned flowmeter made by the process of: forming the one-piece conduit from a material having an uninterrupted material path from the outer surface to the inner surface; and acoustically fitting the first and second transducers to respective ends of the one-piece conduit.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An ultrasonic flowmeter having acoustic noise attenuating features integrally formed on a one-piece conduit is employed to measure the flow of fluid using ultrasonic techniques while reducing the acoustic noise propagating through the conduit wall of the flowmeter. The conduit could be a spool piece, a pipe or a tube, and could be made from any material suitable for a purpose disclosed herein, such as metal, plastic, composite, ceramic or glass, for example.

The conduit can be an integral part of the flowmeter, or a separate tube or pipe that can be coupled to the flowmeter transducers, such as may be employed in a noninvasive flowmeter application for example.

The acoustic noise attenuating features are integrally formed with the wall of the conduit, which performs to attenuate the acoustic wave propagating along the conduit wall so that it will not interfere with the ultrasound signal transmitted through the fluid passing through a fluid port of the conduit.

An embodiment of the invention, as shown and described by the various figures and accompanying text, provides an ultrasonic flowmeter with acoustic noise attenuating features that are integrally formed on a one-piece conduit that provides a flow port for the flowmeter. As used herein, the term one-piece conduit means a section of conduit having no parts that can be completely separated from the body during normal operation, maintenance or disassembly, having no parts that can be completely separated from the body without destroying some portion of the body, and containing no parts that are not integrally formed, where the term integrally formed means formed with material common to the rest of the conduit absent material discontinuities from one region of the conduit to another, such as a conduit produced from a plastic molding process, or a machined or forged metal-working process, for example. Other manufacturing processes suitable for a purpose disclosed herein will be discussed further below.

While embodiments described and illustrated herein depict an example conduit for an ultrasonic flowmeter having a circular cross-section, it will be appreciated that the disclosed invention is not so limited and is also applicable to other cross-section geometries, such as oval, rectangular, triangular, hexagonal, and octagonal, to name a few, for example. Any and all cross-section geometries suitable for a purpose disclosed herein are considered with the scope of the invention.

Figure 4:
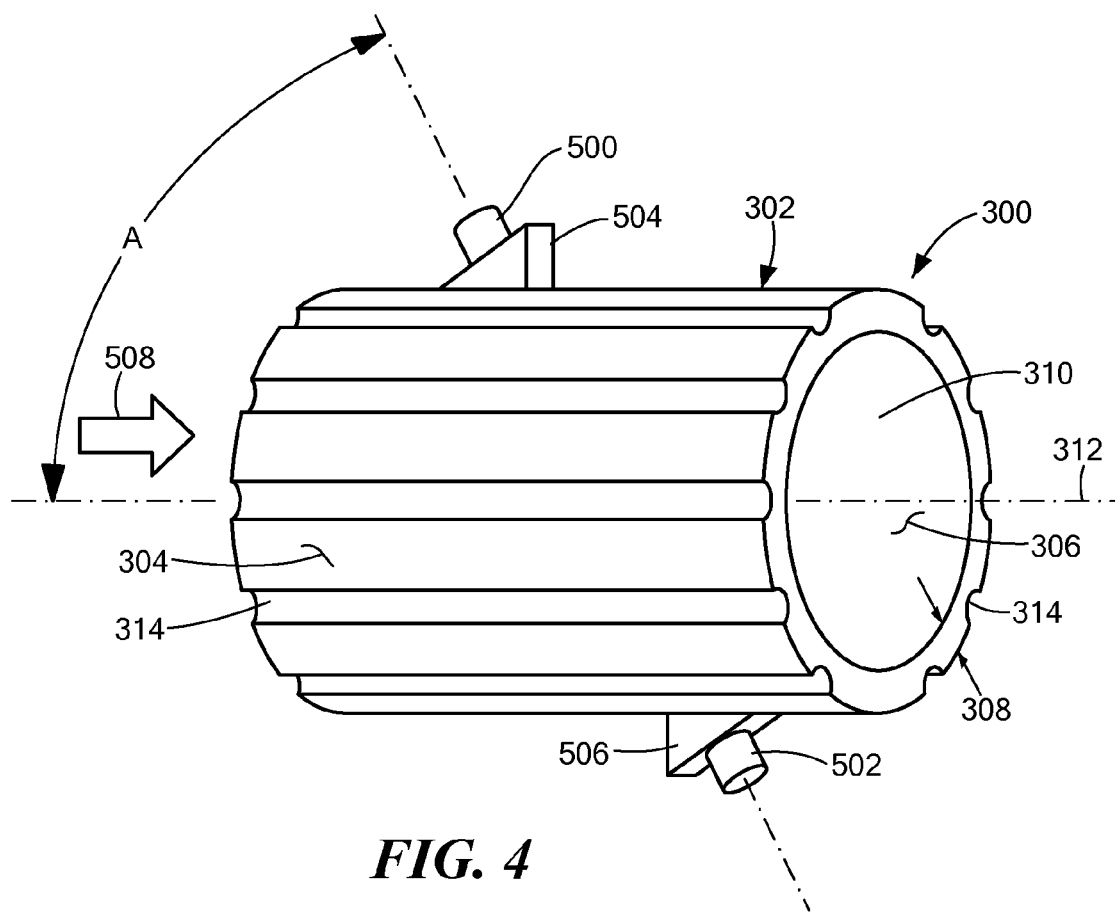
FIG. 4 depicts a type-1 flowmeter having a one-piece conduit with integrally formed semi-circular shaped acoustic noise attenuating features in the form of channels formed on an outer surface of the conduit in accordance with an embodiment of the invention.
Figure 5:
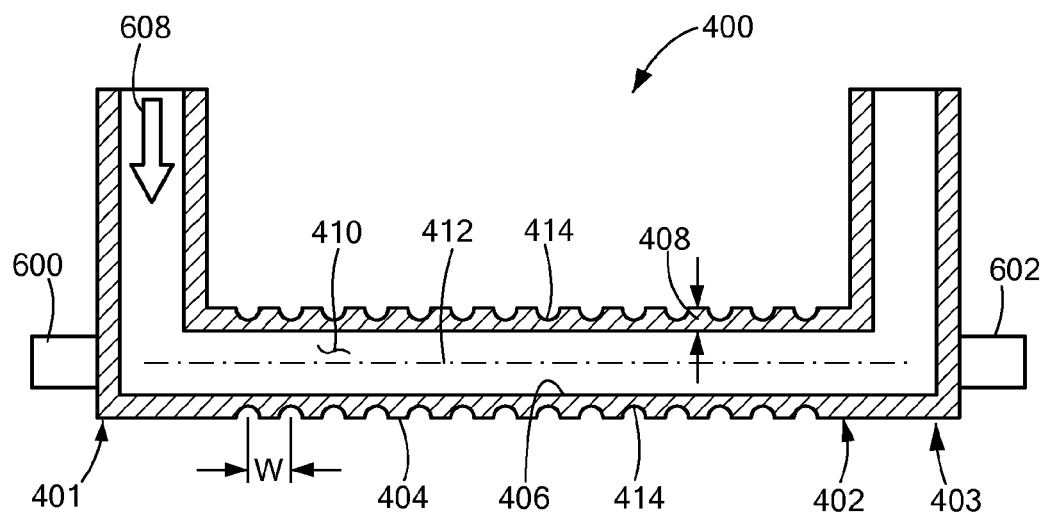
FIG. 5 depicts a type-2 flowmeter having a one-piece conduit with integrally formed semi-circular shaped acoustic noise attenuating features in the form of channels formed on an outer surface of the conduit in accordance with an embodiment of the invention.

Reference is now made to FIG. 4 depicting an embodiment of a type-1 ultrasonic flowmeter 300, and FIG. 5 depicting an embodiment of a type-2 ultrasonic flowmeter 400, where like elements have like reference numerals in the first two decimal places. Each flowmeter 300, 400 is depicted having a one-piece conduit 302, 402 having an outer surface 304, 404 and an inner surface 306, 406 that define a wall thickness 308, 408 therebetween. A first ultrasonic transducer 500, 600 and a second ultrasonic transducer 502, 602 are disposed external of the one-piece conduit 302, 402.

Figure 1:
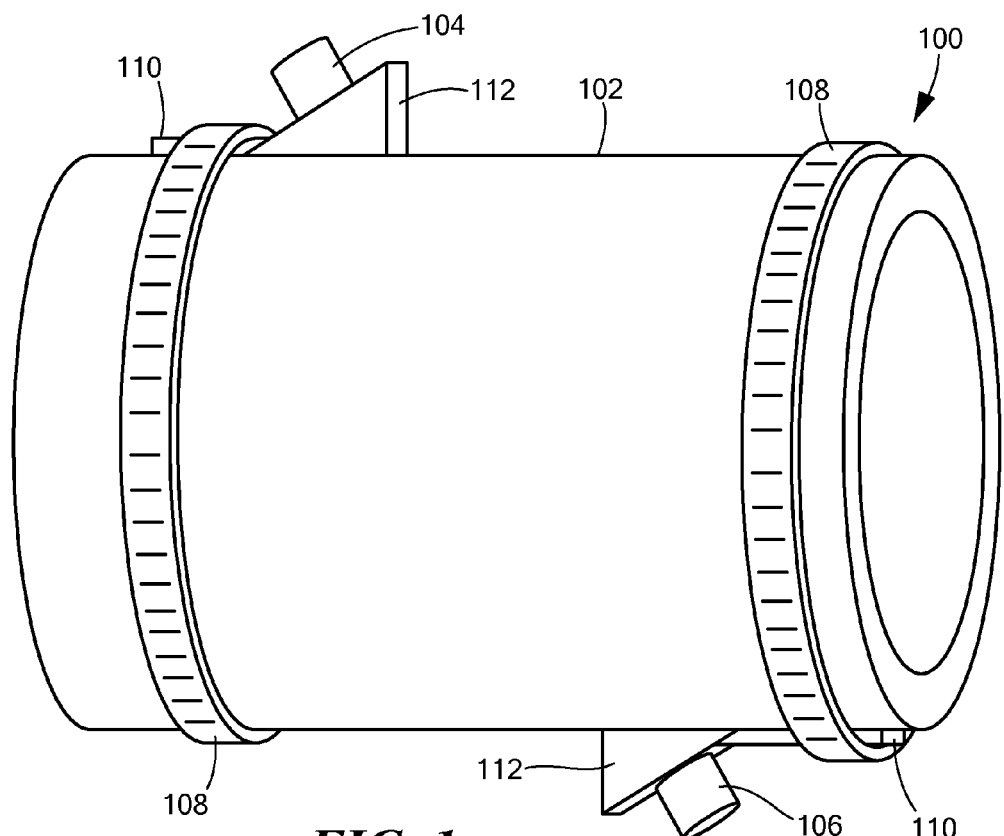
FIG. 1 depicts a type-1 flowmeter having a flow conduit and a pair of ultrasonic transducers fitted in angular signal communication with each other on opposite sides of the conduit.

While FIGS. 4 and 5 depict the first and second ultrasonic transducers 500, 600 and 502, 602, respectively, disposed external of the one-piece conduit 302, 402, which may be an arrangement where the transducers are clamped to the conduit for example, using a pipe clamp or other clamping means similar to that depicted in FIG. 1 for example, it will be appreciated that the scope of the invention is not so limited and also encompasses transducers that are integrally arranged with the one-piece conduit 302, 402, such as by welding, being molded-in, being adhered to, being coupled via threads, being retained via an O-ring and C-clips, being spring-loaded, or being retained by any other means suitable for a purpose disclosed herein, for example. As used herein the term integrally arranged means an arrangement where the transducers are acoustically coupled to the conduit in a manner absent a clamp or clamping means that could be loosened to adjust the axial or circumferential position of the transducers on the conduit when installed in an application setting, whether or not the transducers can or cannot be removed from a transducer receptor that is integrally formed with the one-piece conduit. Alternatively, the term integrally arranged means an arrangement where the transducers cannot be repositioned axially or circumferentially once they are installed on the conduit.

Figure 23A:
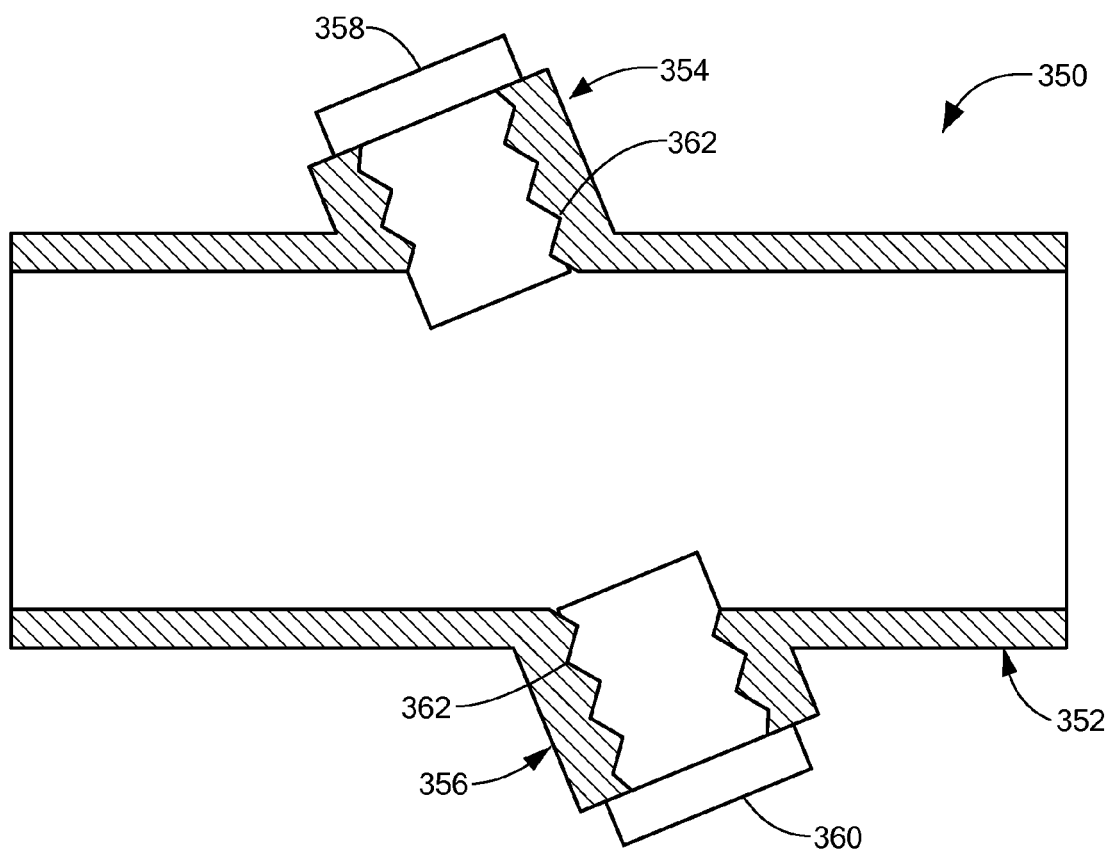
FIGS. 23A and 23B each depict a cross-section view of a type-1 flowmeter similar to that of FIG. 4 but with alternative integrally arranged transducers in accordance with an embodiment of the invention.
Figure 23B:
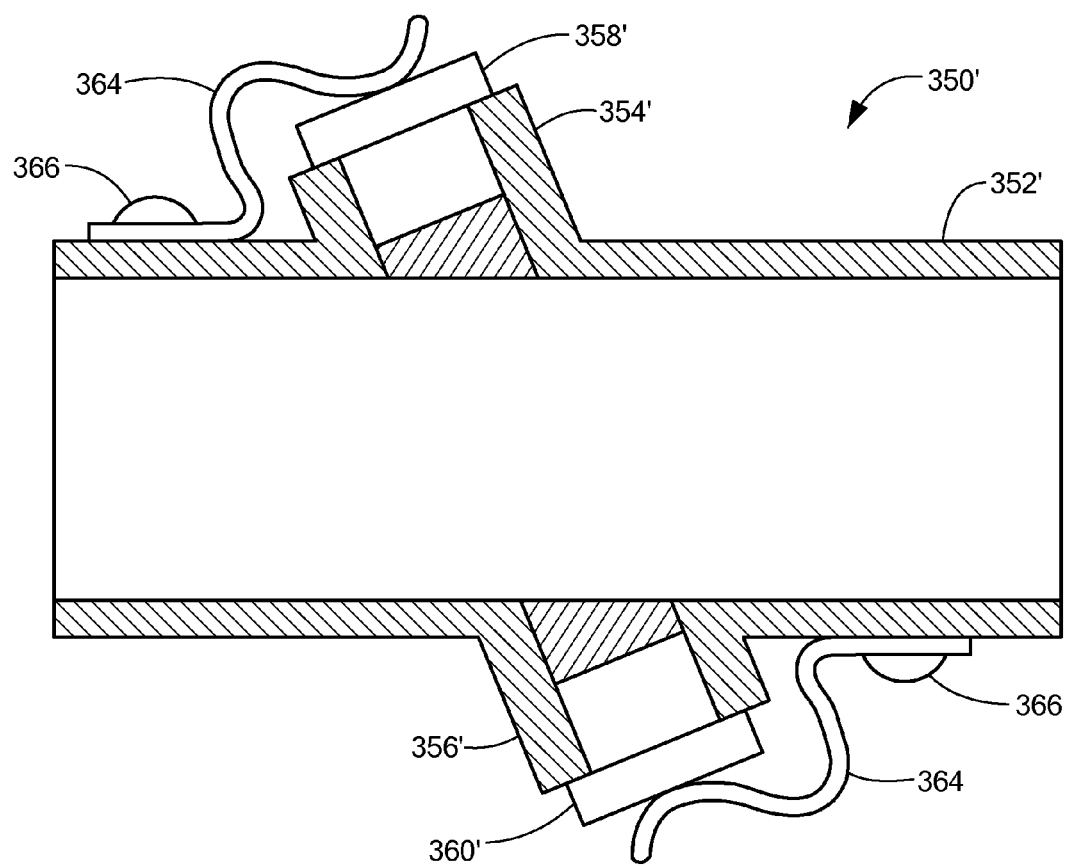

With reference briefly to FIG. 23A, a cross-section view of a type-1 flowmeter 350 is depicted having a one-piece conduit 352 with integrally formed transducer receptors 354, 356 in which ultrasonic transducers 358, 360 are fitted in a wetted transducer arrangement via welding, being molded-in, being adhered to, being coupled via threads, being retained via an O-ring and C-clip, being spring-biased, or being retained in a transducer receptor by any other means suitable for a purpose disclosed herein, for example. While FIG. 23A depicts a fitted arrangement using threads 362, it will be appreciated that the threads 362 could be replaced by a weld, an adhesive, a molded-in arrangement, or a spring-biased arrangement, without detracting from the scope of the invention disclosed herein. It will also be appreciated that the ultrasonic transducers may be integrally arranged with the one-piece conduit and fitted in a non-wetted transducer arrangement. For example, and with reference briefly to FIG. 23B, a cross-section view of a type-1 flowmeter 350' is depicted similar to the flowmeter 350 of FIG. 23A, but in a non-wetted transducer arrangement and employing a spring 364, held to the one-piece conduit 352' via fasteners 366 or disposed relative to the one-piece conduit 352' in any other manner suitable for a purpose disclosed herein, that spring biases the ultrasonic transducers 358', 360' toward the one-piece conduit 352' in a slidable arrangement with the integrally formed transducer receptors 354', 356' having blind pockets. And while FIGS. 23A and 23B each depict integrally arranged transducers in a type-1 flowmeter, it will be appreciated that a similar arrangement of integrally arranged transducers may be employed in a type-2 flowmeter, which is herein contemplated and considered within the scope of the invention disclosed herein.

While embodiments of the invention are disclosed herein having the first and second transducers 500, 502 disposed on opposite sides of the flowmeter body 302, it will be appreciated that the scope of the invention is not so limited and also encompasses other configurations, such as transducers disposed on a same side of the flowmeter body 302, disposed orthogonal to each other on a side of the flowmeter body 302, or disposed at an angle other than 180-degrees or 90-degrees relative to each other on a side of the flowmeter body 302, which will be discussed further below in connection with FIGS. 25-29.

With reference now back to FIG. 4, the transducers 500, 502 are disposed in signal communication with an interior volume 310 of the one-piece conduit 302, and are disposed relative to each other such that each transducer 500, 502 can send and receive an acoustic signal to the other transducer 502, 500, respectively, through the interior volume 310 at an angle A relative to a central axis 312 of the one-piece conduit 302. In the embodiment of FIG. 4, the first and second transducers 500, 502 are each disposed in signal communication with the outer surface 304 of and on opposite sides of the one-piece conduit 302 via mounting blocks 504, 506, respectively. The first transducer 500 is disposed upstream of the second transducer 502, as indicated via flow line 508.

With reference to FIG. 5, the transducers 600, 602 are disposed in signal communication with an interior volume 410 of the one-piece conduit 402, and are disposed relative to each other such that each transducer 600, 602 can send and receive an acoustic signal to the other transducer 602, 600, respectively, through the interior volume 410 in a direction parallel to a central axis 412 of the one-piece conduit 402. In the embodiment of FIG. 5, the first and second transducers 600, 602 are each disposed in signal communication with opposite ends 401, 403 of the one-piece conduit 402. The first transducer 600 is disposed upstream of the second transducer 602, as indicated via flow line 608.

With reference to FIGS. 4 and 5 together, each one-piece conduit 302, 402 includes a plurality of acoustic noise attenuating features 314, 414, which will be discussed in more detail below, that are integrally formed with at least one of the outer surface 304, 404 and the inner surface 306, 406, and are disposed between respective ones of the first and second transducers 500, 502 and 600, 602. Each acoustic noise attenuating feature 314, 414 is configured and oriented to disturb a propagation direction of a parasitic acoustic wave that will propagate in the wall 308, 408 of the one-piece conduit 302, 402 in response to activation of at least one of the respective transducers 500, 502 and 600, 602. Generally, the higher the number of acoustic noise attenuating features arranged between transducers, the more the parasitic acoustic noise will be attenuated, and the larger the width and/or depth of cut of the acoustic noise attenuating features, the better the attenuation effect will be. However, the physical dimensions of the conduit itself will limit the number of acoustic noise attenuating features that can be employed, and the depth of cut of the acoustic noise attenuating features will be limited by the pressure requirements inside of the conduit.

In the embodiment of FIG. 4, the parasitic acoustic wave will propagate circumferentially around and axially along the one-piece conduit 302 from the transmitting transducer to the receiving transducer.

In the embodiment of FIG. 5, the parasitic acoustic wave will propagate axially along the one-piece conduit 402 from the transmitting transducer to the receiving transducer.

As depicted in FIGS. 4 and 5, the cross-sectional wall thickness of the one-piece conduit 302, 402 varies between the first transducer 500, 600 and the second transducer 502, 602 to form a plurality of discontinuous boundaries in the wall 308, 408 of the one-piece conduit 302, 402 in the propagation direction of the parasitic acoustic wave, where the acoustic noise attenuating features 314, 414 are defined by the plurality of discontinuous boundaries. Stated alternatively, in an embodiment the plurality of discontinuous boundaries are defined by surface contours of the channels, or the projections as discussed further below, of the acoustic noise attenuating features 314, 414 that are cut into, or protrude from as discussed further below, the surface of the one-piece conduit 302, 402.

Figure 6:
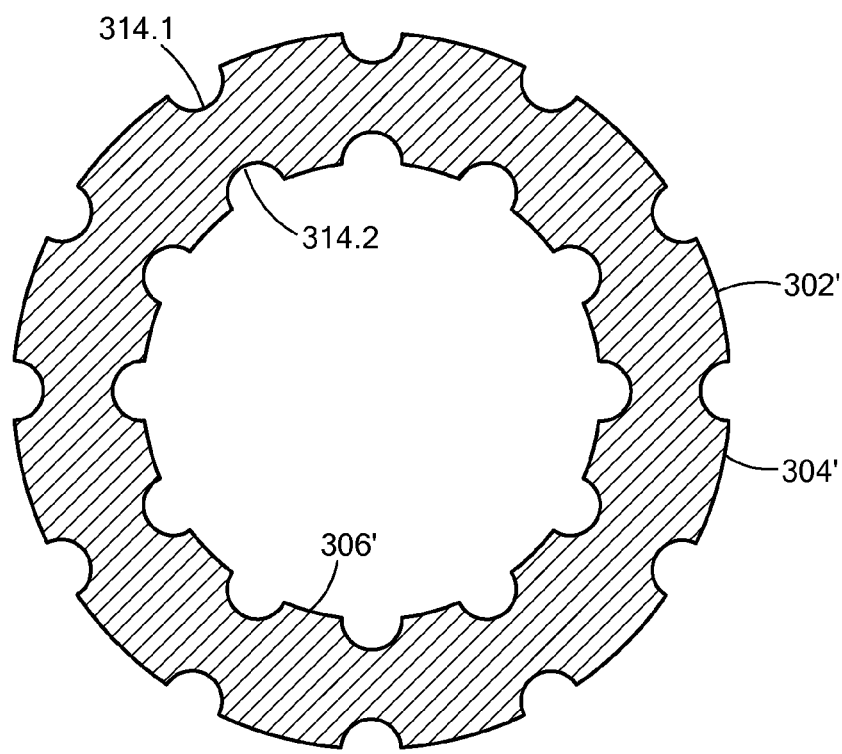
FIG. 6 depicts a cross-section view of a flow conduit for a type-1 flowmeter similar to that of FIG. 4, but with integrally formed semi-circular shaped acoustic noise attenuating features in the form of channels formed on outer and inner surfaces of the conduit in accordance with an embodiment of the invention.
Figure 7:
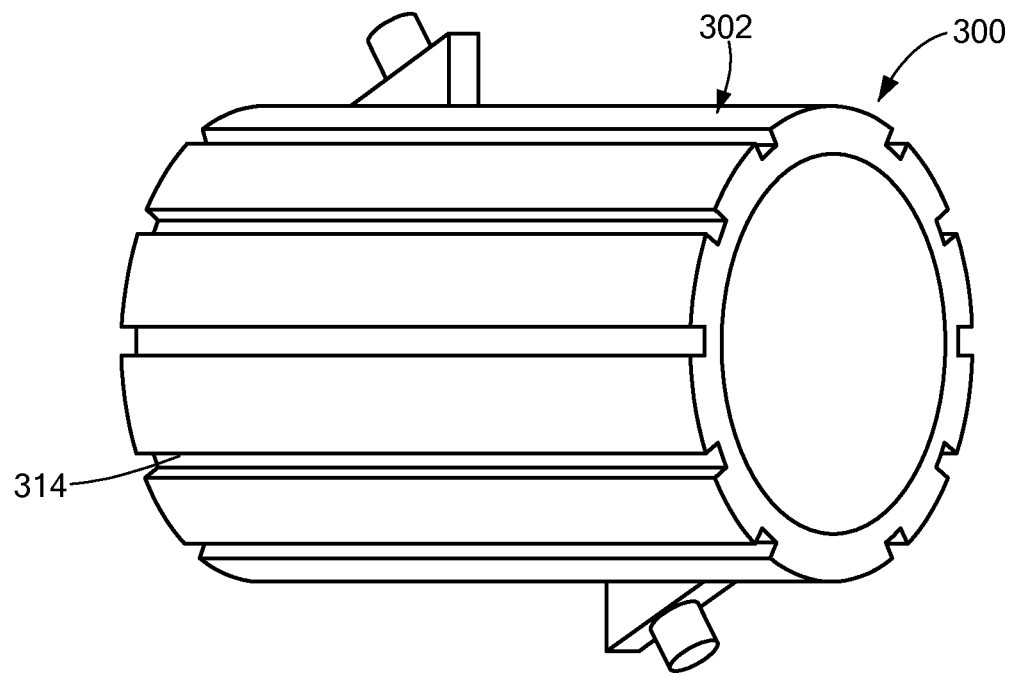
FIG. 7 depicts a type-1 flowmeter similar to that of FIG. 4, but with integrally formed rectangular shaped acoustic noise attenuating features in the form of channels formed on an outer surface of the conduit in accordance with an embodiment of the invention.
Figure 8:
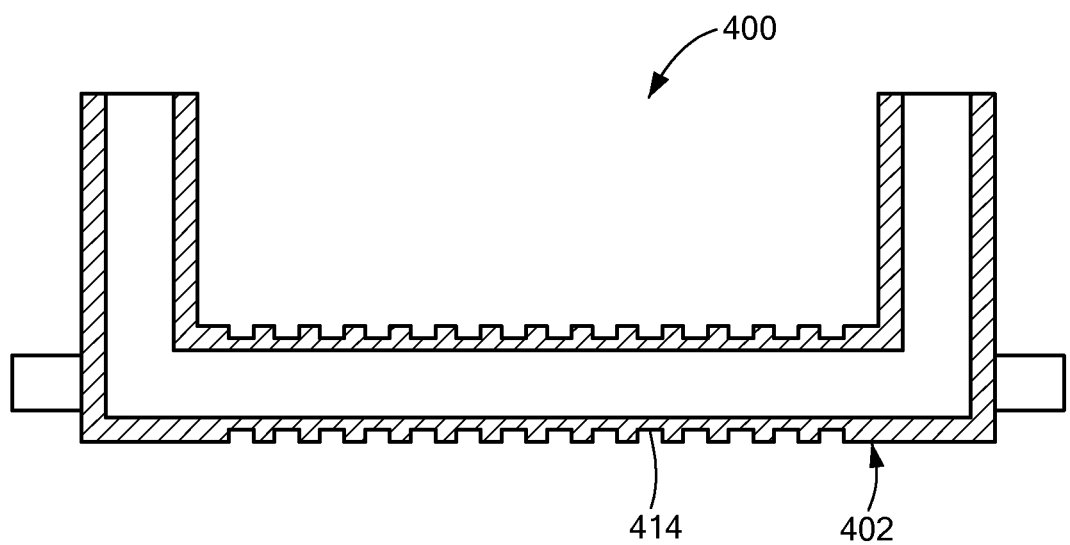
FIG. 8 depicts a type-2 flowmeter similar to that of FIG. 5, but with integrally formed rectangular shaped acoustic noise attenuating features in the form of channels formed on an outer surface of the conduit in accordance with an embodiment of the invention.
Figure 9:
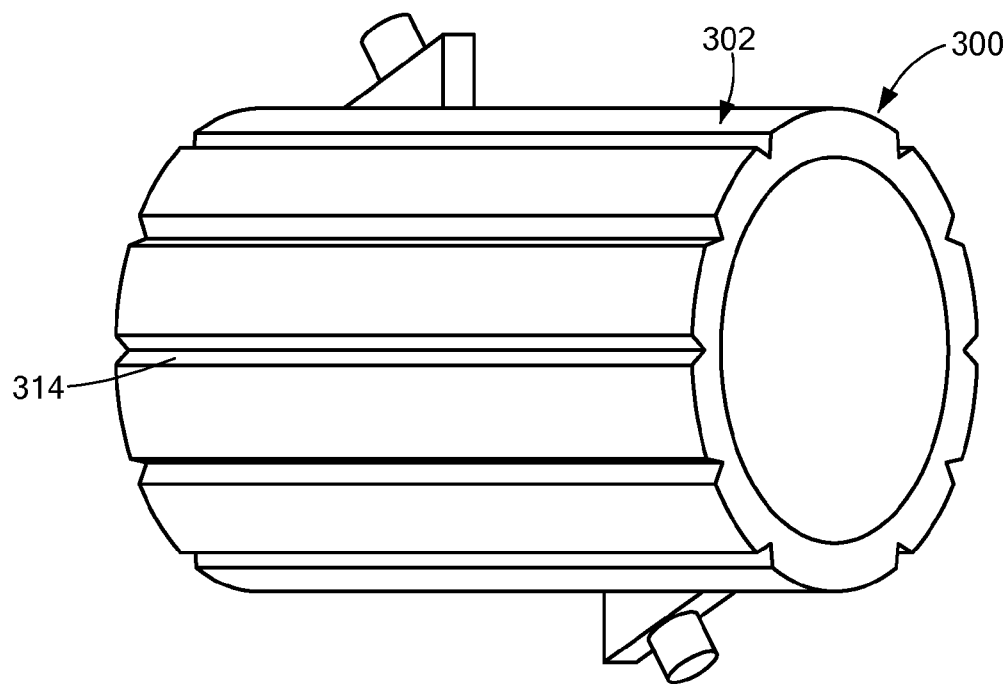
FIG. 9 depicts a type-1 flowmeter similar to that of FIG. 4, but with integrally formed triangular shaped acoustic noise attenuating features in the form of channels formed on an outer surface of the conduit in accordance with an embodiment of the invention.
Figure 10:
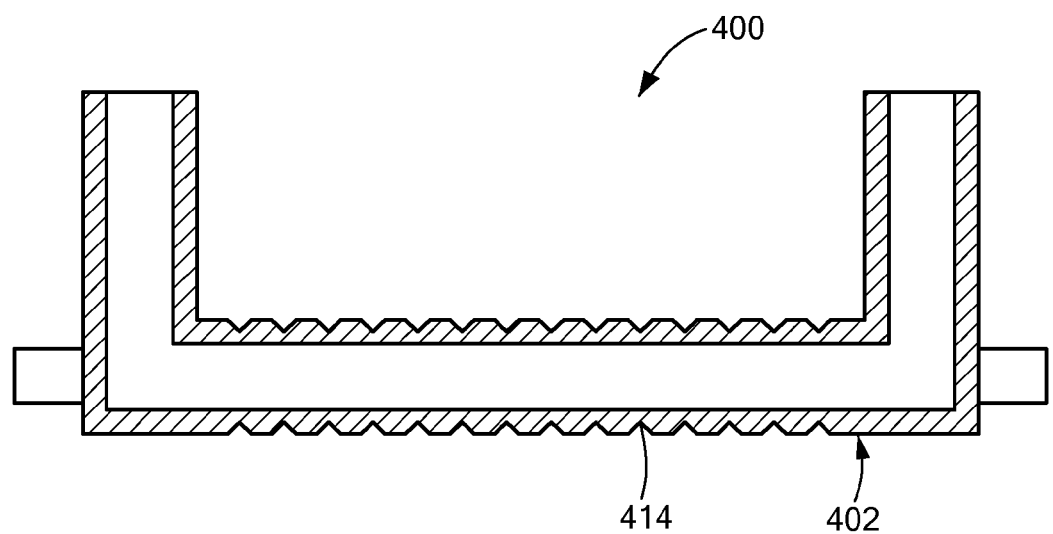
FIG. 10 depicts a type-2 flowmeter similar to that of FIG. 5, but with integrally formed triangular shaped acoustic noise attenuating features in the form of channels formed on an outer surface of the conduit in accordance with an embodiment of the invention.

Reference is now made to FIG. 6, which depicts a cross-section view of a one-piece conduit 302' alternative to the one-piece conduit 302 depicted in FIG. 4. Where the one-piece conduit 302 of FIG. 4 has acoustic noise attenuating features 314 integrally formed with the outer surface 304, the one-piece conduit 302' of FIG. 6 has acoustic noise attenuating features 314.1 and 314.2 integrally formed with the outer and inner surfaces 304', 306', respectively. As depicted in FIGS. 4, 5 and 6, the discontinuous boundaries of the acoustic noise attenuating features 314, 414, 314.1 and 314.2, are defined by elongated channels having a semi-circular profile cut into the surfaces of the one-piece conduits. However, it will be appreciated that the scope of the invention is not so limited and also encompasses noise attenuating channels having other profiles, such as a rectangular profile as depicted in FIGS. 7 and 8, a triangular profile as depicted in FIGS. 9 and 10, or any other profile suitable for a purpose disclosed herein, such as a trapezoidal profile, a polygon-shaped profile, or a curved profile, for example. In an embodiment, acoustic noise attenuating features 314, 314.1 and 314.2 are elongated in an axial direction, or a generally axial direction, with respect to the one-piece conduit 302, 302', and acoustic noise attenuating features 414 are elongated in a circumferential direction, or a generally circumferential direction, around the one-piece conduit 402.

Figure 11:
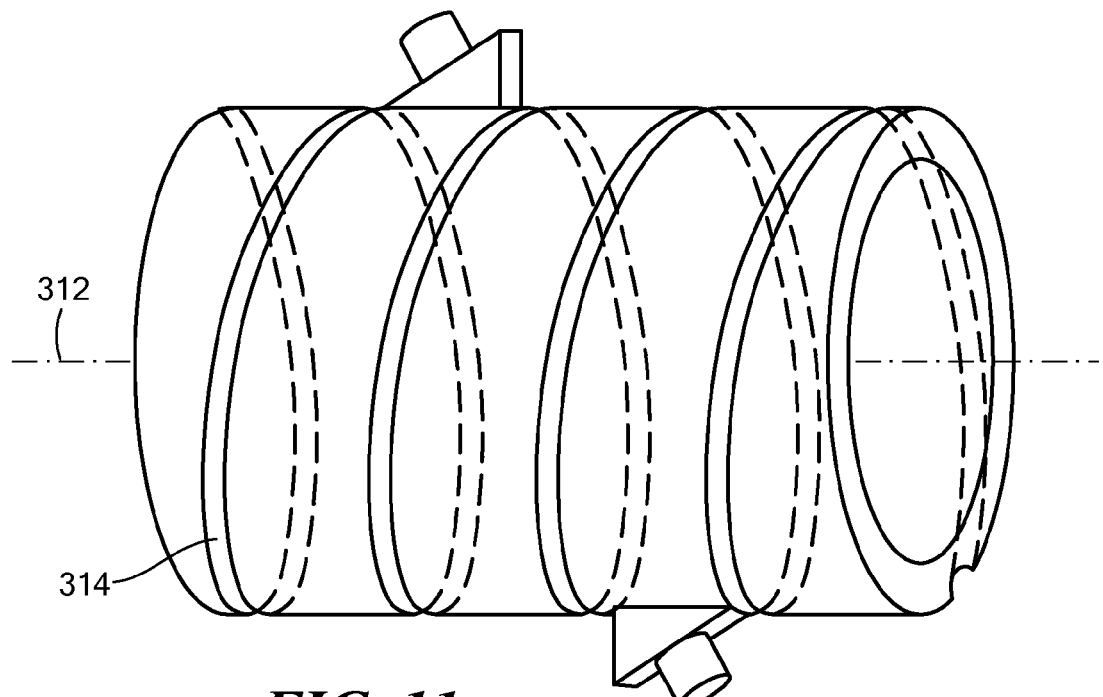
FIG. 11 depicts a conduit for a type-1 flowmeter similar to the conduit of FIG. 4, but with integrally formed acoustic noise attenuating features arranged helically about the longitudinal axis of the conduit in accordance with an embodiment of the invention.
Figure 12:
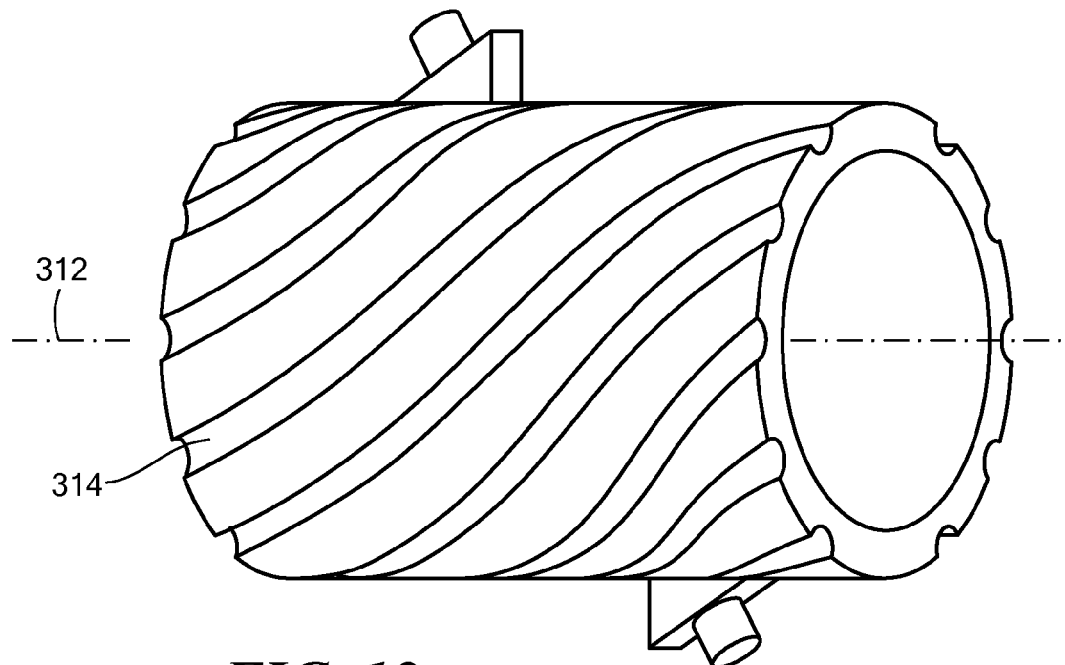
FIG. 12 depicts a conduit for a type-1 flowmeter similar to the conduit of FIG. 4, but with integrally formed acoustic noise attenuating features arranged at an angle relative to the longitudinal axis of the conduit in accordance with an embodiment of the invention.
Figure 13:
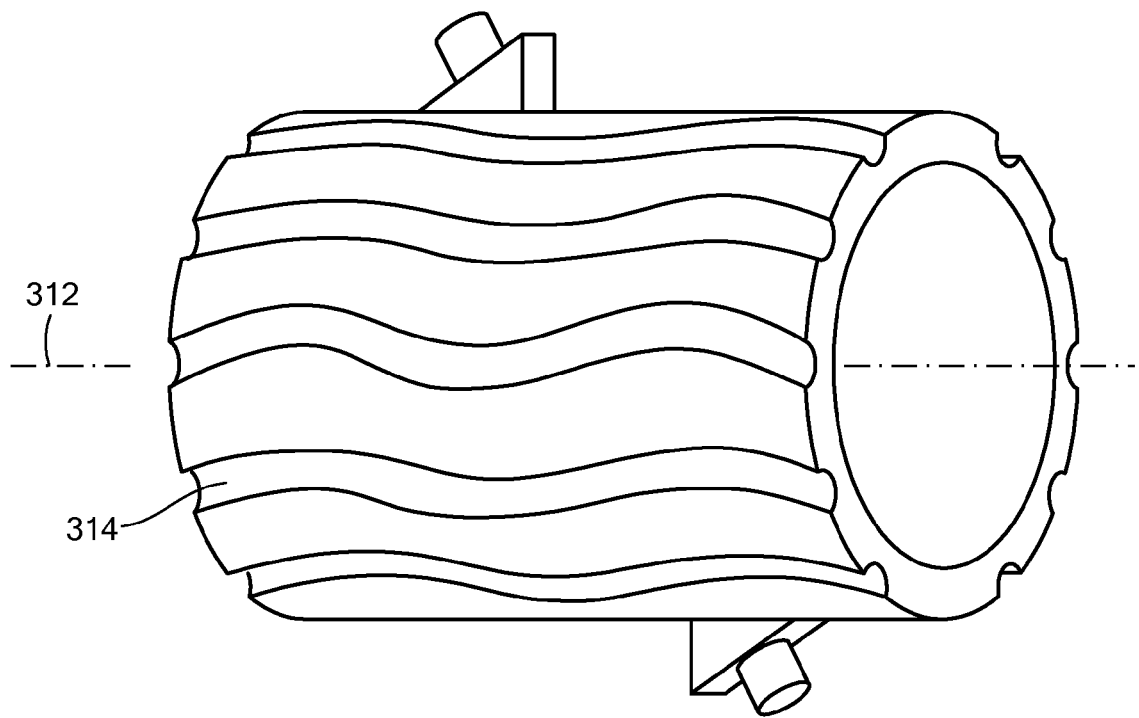
FIG. 13 depicts a conduit for a type-1 flowmeter similar to the conduit of FIG. 4, but with integrally formed acoustic noise attenuating features arranged in a curved manner in a direction parallel to the longitudinal axis of the conduit in accordance with an embodiment of the invention.

With reference back to FIG. 4 depicting a one-piece conduit 302 for a type-1 flowmeter 300, the plurality of discontinuous boundaries of the acoustic noise attenuating features 314 are oriented parallel with the longitudinal axis 312 of the one-piece conduit 302. However, it will be appreciated that the scope of the invention is not so limited, and encompasses other orientations for the plurality of discontinuous boundaries, such as helical about the longitudinal axis 312 as depicted in FIG. 11, at an angle relative to the longitudinal axis 312 as depicted in FIG. 12, curved in a direction parallel to the longitudinal axis 312 as depicted in FIG. 13, or any combination of the foregoing orientations.

Figure 14:
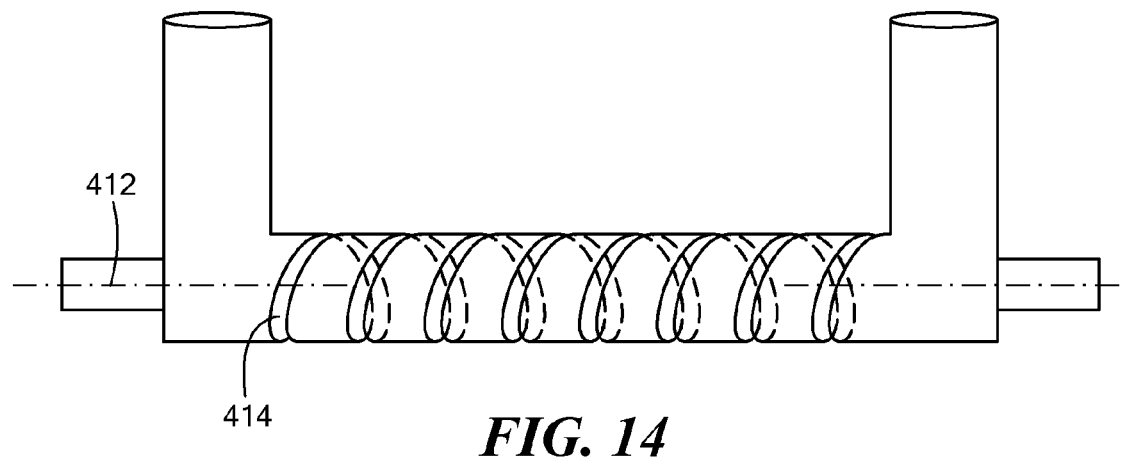
FIG. 14 depicts a conduit for a type-2 flowmeter similar to the conduit of FIG. 5, but with integrally formed acoustic noise attenuating features arranged helically about the longitudinal axis of the conduit in accordance with an embodiment of the invention.
Figure 15:
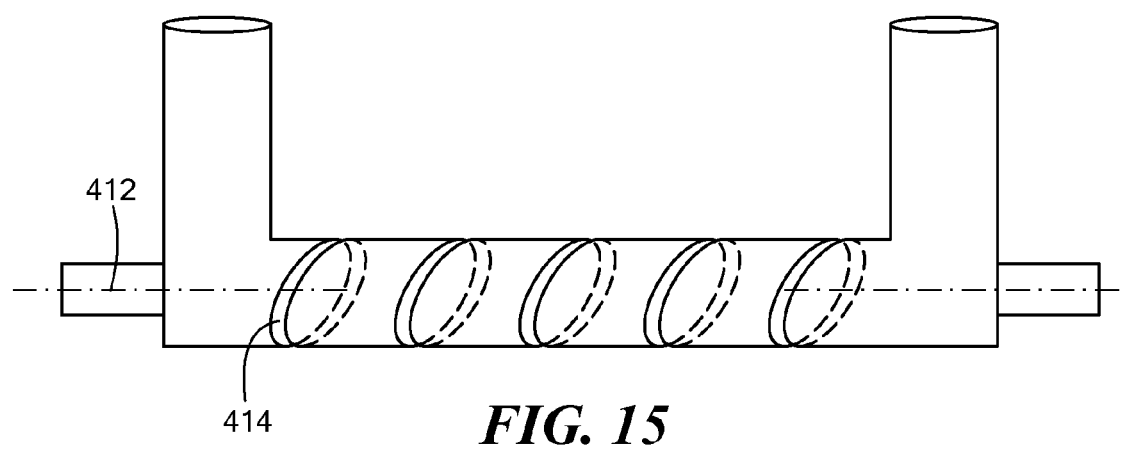
FIG. 15 depicts a conduit for a type-2 flowmeter similar to the conduit of FIG. 5, but with integrally formed acoustic noise attenuating features arranged at an angle relative to the longitudinal axis of the conduit in accordance with an embodiment of the invention.
Figure 16:
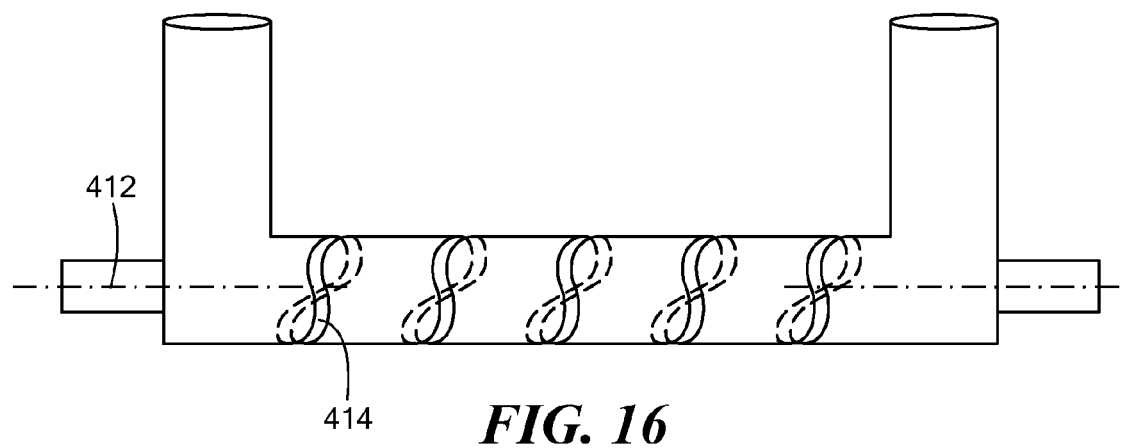
FIG. 16 depicts a conduit for a type-2 flowmeter similar to the conduit of FIG. 5, but with integrally formed acoustic noise attenuating features arranged in a curved manner in a direction perpendicular to the longitudinal axis of the conduit in accordance with an embodiment of the invention.

With reference back to FIG. 5 depicting a one-piece conduit 402 for a type-2 flowmeter 400, the plurality of discontinuous boundaries of the acoustic noise attenuating features 414 are oriented perpendicular to the longitudinal axis 412 of the one-piece conduit 402. However, it will be appreciated that the scope of the invention is not so limited, and encompasses other orientations for the plurality of discontinuous boundaries, such as helical about the longitudinal axis 412 as depicted in FIG. 14, at an angle relative to the longitudinal axis 412 as depicted in FIG. 15, curved in a direction perpendicular to the longitudinal axis 412 as depicted in FIG. 16, or any combination of the foregoing orientations.

Figure 17:
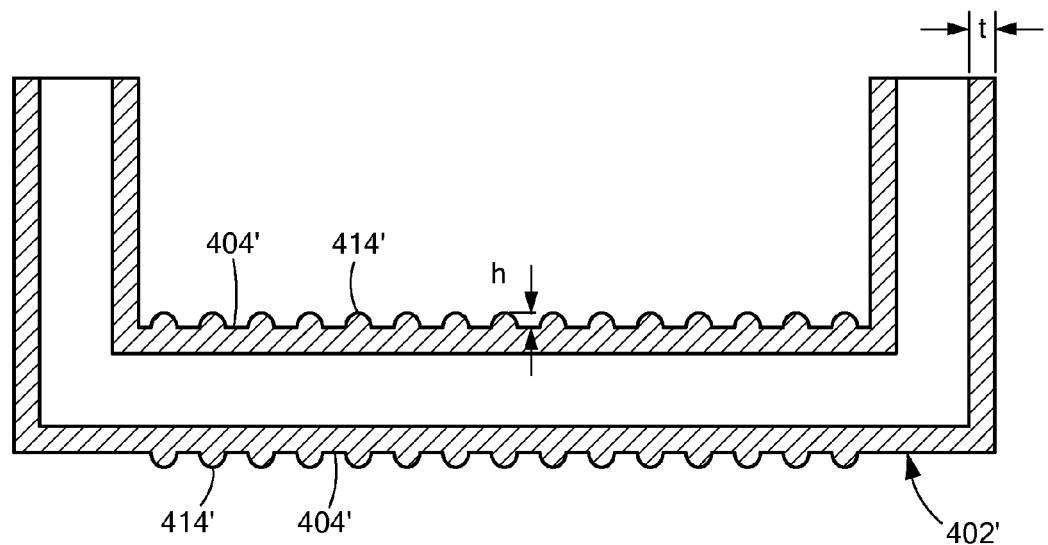
FIG. 17 depicts a conduit for a type-2 flowmeter similar to the conduit of FIG. 5, but with integrally formed acoustic noise attenuating features in the form of semi-circular projections formed on an outer surface of the conduit in accordance with an embodiment of the invention.
Figure 18:
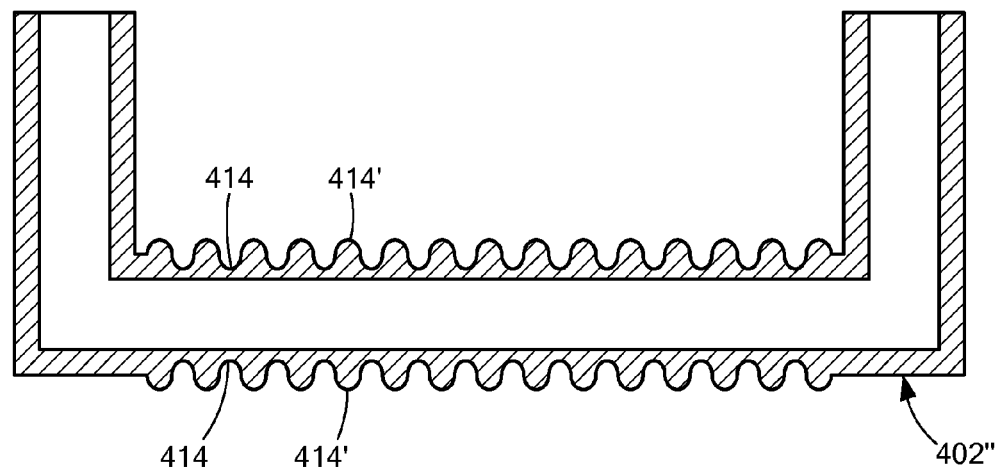
FIG. 18 depicts a conduit for a type-2 flowmeter similar to the conduit of FIG. 5, but with integrally formed acoustic noise attenuating features in the form of semi-circular channels and projections formed on an outer surface of the conduit in accordance with an embodiment of the invention.

With reference now to FIG. 17, a one-piece conduit 402' for a type-2 flowmeter similar to that depicted in FIG. 5 is now depicted having a plurality of discontinuous boundaries of a plurality of acoustic noise attenuating features 414' defined by semi-circular projections that extend outward beyond an outer surface 404' of the one-piece conduit 402' to a height "h" around a circumference of the one-piece conduit 402'. From the foregoing, it will be appreciated that channels 414 and projections 414' can be combined on the same one-piece conduit 402", as depicted in FIG. 18. It will also be appreciated one-piece conduits for type-1 as well as type-2 flowmeters may be formed with a combination of channels and projections that serve form the plurality of discontinuous boundaries of the plurality of acoustic noise attenuating features as herein described, depending on the manufacturing process used to make the one-piece conduits, which will be discussed further below. From the forgoing descriptions, it will also be appreciated that the projections 414' could be rectangular projections, triangular projections, trapezoidal projections, or projections having any other geometry suitable for a purpose disclosed herein, such as a polygon-shaped profile, or a curved profile, for example.

Figure 19:
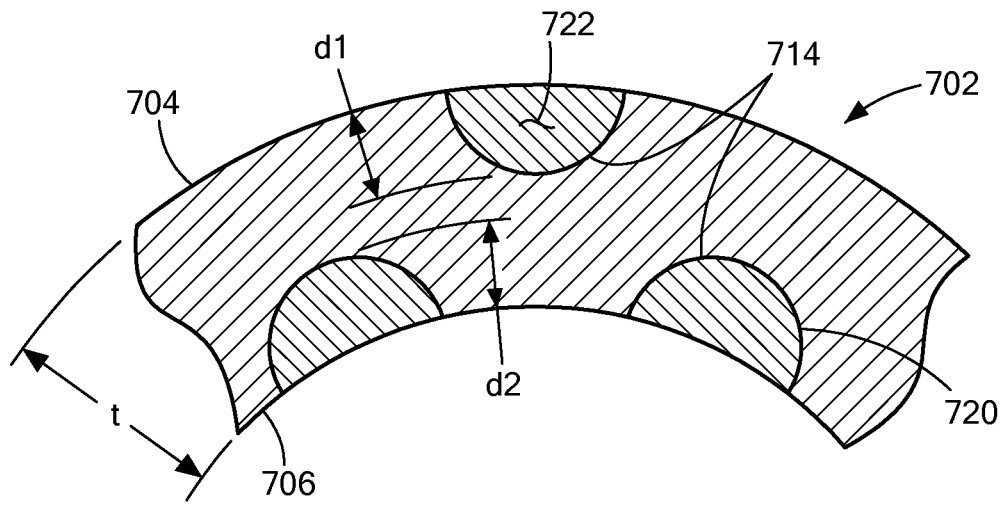
FIG. 19 depicts a partial cross-section view of a conduit for a type-1 flowmeter similar to the conduit of FIGS. 4 and 6, but with an acoustic noise damping filler material disposed in the channels of the acoustic noise attenuating features in accordance with an embodiment of the invention.
Figure 20:
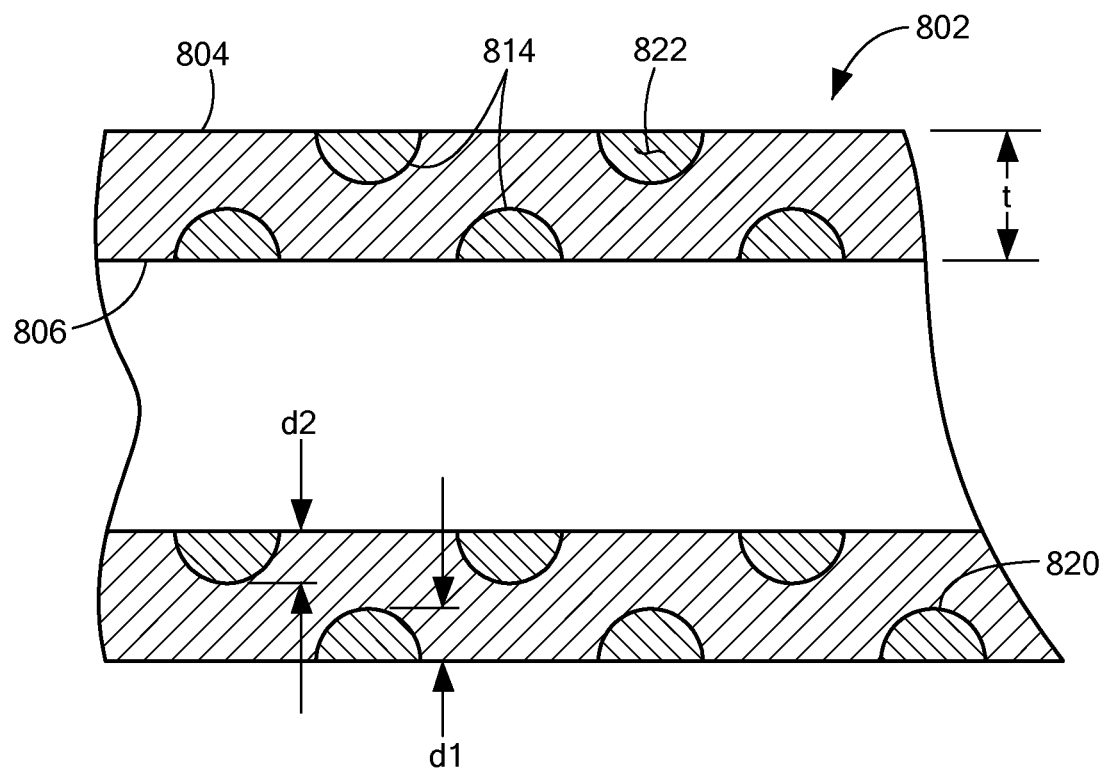
FIG. 20 depicts a partial cross-section view of a conduit for a type-2 flowmeter similar to the conduit of FIG. 5, but with an acoustic noise damping filler material disposed in the channels of the acoustic noise attenuating features in accordance with an embodiment of the invention.

Reference is now made to FIGS. 19 and 20, which depict partial cross-section views of one-piece conduits 702, 802 for type-1 and type-2 flowmeters, respectively, similar to the one-piece conduits 302, 402 depicted in FIGS. 4 and 5. As depicted in FIGS. 19 and 20, the plurality of discontinuous boundaries associated with the acoustic noise attenuating features 714, 814 form a plurality of pockets 720, 820 having a depth d1, d2 relative to at least one of the outer surface 704, 804 and the inner surface 706, 806, respectively. In an embodiment, a filler material 722, 822 is disposed within the plurality of pockets 720, 820. The filler material 722, 822 is acoustically different from the material of the one-piece conduit 702, 802, and may be made from an acoustic damping material that includes a thermoplastic, a polymer, a rubber, an epoxy, an elastomeric material, a viscoelastic material, or any combination of the foregoing damping materials. By having acoustic noise attenuating features 714, 814 on an interior surface 706, 806 of a one-piece conduit 702, 802 filled with an acoustic filler material 722, 822, the flow of fluid within the one-piece conduit 702, 802 will not be unduly disturbed by the presence of the acoustic noise attenuating features 714, 814.

In an embodiment, a ratio of the minimum cross-sectional wall thickness to the maximum cross-sectional wall thickness of the one-piece conduit has a range from around 0.1 to around 0.9, and in another embodiment has a range from around 0.25 to around 0.75. Alternatively, and with reference to FIGS. 19 and 20, where the one-piece conduit has a nominal wall thickness "t", the ratio of the depth "d1", "d2", or each of "d1" and "d2", to the nominal wall thickness "t" has a range from around 0.1 to around 0.9, and in another embodiment has a range from around 0.25 to around 0.75. Further alternatively, and with reference to FIG. 17, the ratio of the height "h" to the nominal wall thickness "t" has a range from around 0.1 to around 0.9, and in another embodiment has a range from around 0.25 to around 0.75. The aforementioned depth or height may vary depending on the pressure requirements imposed upon the flowmeter, and/or the degree of noise attenuation desired in the flowmeter.

Figure 21:
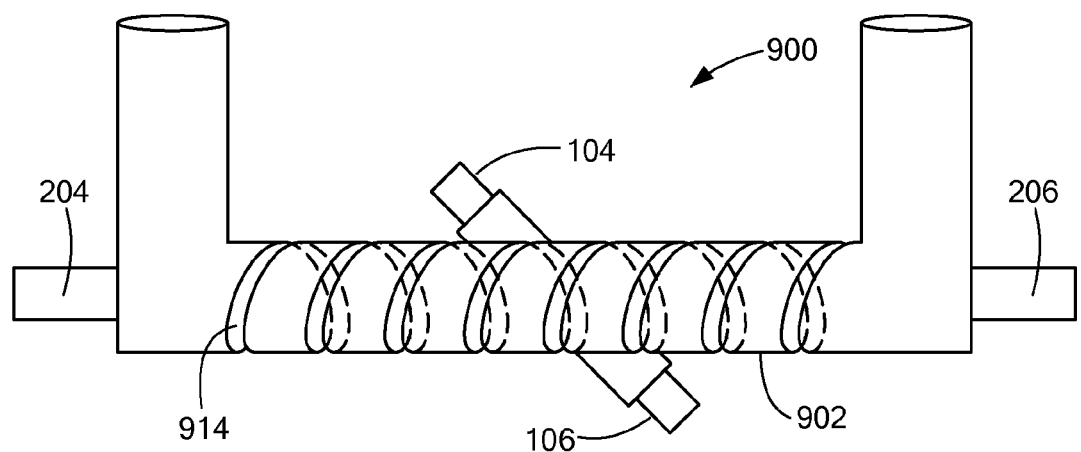
FIG. 21 depicts a combination type-1 and type-2 flowmeter in accordance with an embodiment of the invention.
Figure 22:
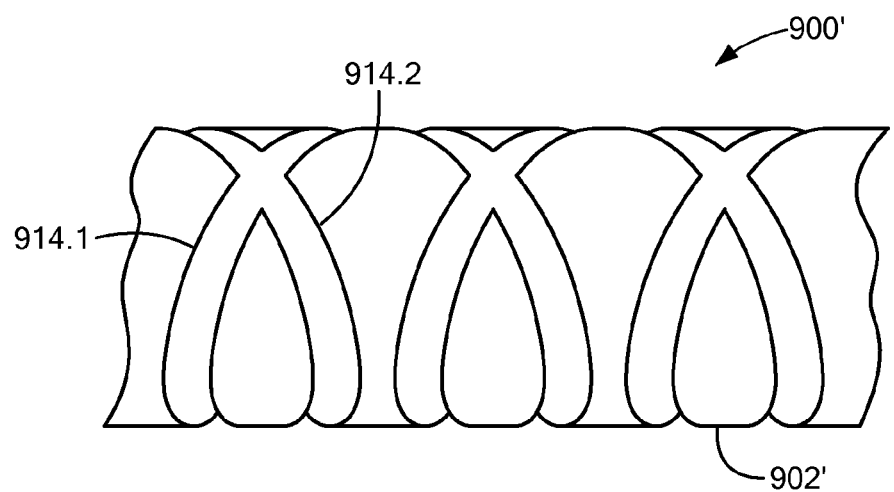
FIG. 22 depicts a conduit for another combination type-1 and type-2 flowmeter in accordance with an embodiment of the invention.

From the foregoing descriptions, and with reference now to FIG. 21, it will be appreciated that various embodiments of type-1 and type-2 flowmeters having acoustic noise attenuating features as herein described may be combined into a single flowmeter 900. As depicted in FIG. 21, the flowmeter 900 has a one-piece conduit 902 with helical acoustic noise attenuating features 914 formed thereon in a manner previously and herein described, and has both type-1 and type-2 transducers 104, 106 and 204, 206, respectively, coupled thereto in a manner previously and herein described. By providing a one-piece conduit 902 with helical acoustic noise attenuating features 914, a common manufacturing process to produce either a type-1 or a type-2 flowmeter, or a combination of both, can be utilized. Furthermore, and with reference to FIG. 22, the SNR associated with a one-piece conduit 902' of a flowmeter 900' may be enhanced over the configuration depicted in FIG. 21 by forming on the one-piece conduit 902', in a manner previously and herein described, first helical acoustic noise attenuating features 914.1 having a first turning direction, and second helical acoustic noise attenuating features 914.2 having a second opposite turning direction, such that the two sets of acoustic noise attenuating features 914.1, 914.2 crisscross one another.

With reference to the various structures herein described, it will be appreciated that one-piece conduits 302, 402, 702, 802, 902, 902' for flowmeters may be made in a variety of different ways using a variety of different manufacturing processes.

In an embodiment, the one-piece conduit 302, 402, 702, 802, 902, 902' is made from a metal, such as steel, stainless steel, copper, aluminum, or any other metal suitable for a purpose disclosed herein, and is made by a process that forms the one-piece conduit with the aforementioned integrally formed plurality of acoustic noise attenuating features via a machining, forging, casting, extruding, or pultruding process, or any other process suitable for a material and purpose disclosed herein. The material forming the one-piece conduit has an uninterrupted material path from the outer surface to the inner surface of the one-piece conduit.

Figure 2:
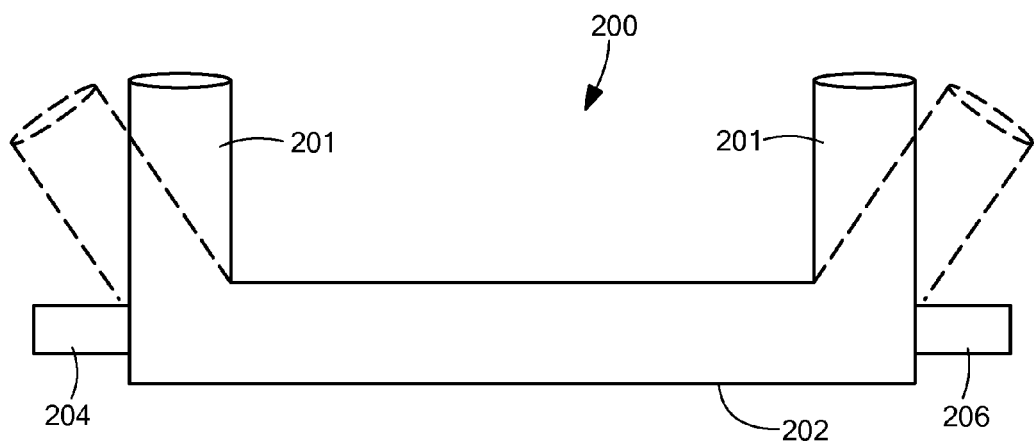
FIG. 2 depicts a type-2 flowmeter having a U-shaped flow conduit and a pair of ultrasonic transducers fitted in linear signal communication with each other on opposite ends of the conduit.
Figure 3:
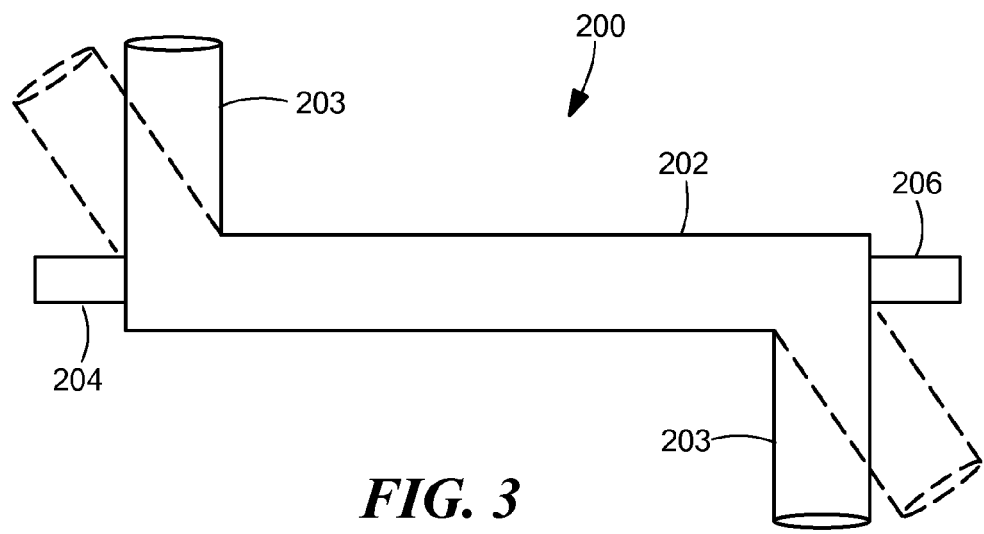
FIG. 3 depicts another type-2 flowmeter having a Z-shaped flow conduit and a pair of ultrasonic transducers fitted in linear signal communication with each other on opposite ends of the conduit.

In another embodiment, a first conduit is provided absent the aforementioned plurality of acoustic noise attenuating features (see FIGS. 1 and 2 for example). The plurality of acoustic noise attenuating features are then subsequently machined into the outer surface, the inner surface, or both surfaces, of the first conduit to form the one-piece conduit having the plurality of acoustic noise attenuating features integrally formed thereon.

In another embodiment, the one-piece conduit is a thermoplastic, a polymer, a rubber, an epoxy, an elastomeric material, a viscoelastic material, or any combination of the foregoing damping materials, and is made from a process that forms the one-piece conduit with the aforementioned integrally formed plurality of acoustic noise attenuating features via a molding, blow-molding, extruding, pultruding, machining, or 3D printing process, or any other process suitable for a material and purpose disclosed herein. The material forming the one-piece conduit has an uninterrupted material path from the outer surface to the inner surface of the one-piece conduit.

In an embodiment of a type-1 flowmeter, the manufacturing process further includes acoustically fitting the first and second transducers 104, 106 to the outer surface of the one-piece conduit, and in an embodiment of a type-2 flowmeter, the manufacturing process further includes acoustically fitting the first and second transducers 204, 206 to respective ends of the one-piece conduit.

Through various tests, either empirical and/or mathematical modeling, it has been found that a flowmeter having a structure described herein with a one-piece conduit having integrally formed acoustic noise attenuating features has an improved SNR as compared to a similar flowmeter absent such acoustic noise attenuating features. While not being held to any particular theory, it is contemplated that the discontinuous boundaries on the surface of the one-piece conduit formed by the acoustic noise attenuating features reflect, deflect, or otherwise disturb a parasitic acoustic wave that attempts to propagate through the wall thickness of the one-piece conduit from a transmitting transducer to a receiving transducer. Mathematical modeling, validated by empirical data, has shown that a flowmeter body with a plurality of acoustic noise attenuating features (ANAFs) in the form of square grooves cut into the body of a type-2 flowmeter (see FIG. 8 for example) reduces acoustic noise by more than 85 percent when compared to an otherwise identical flowmeter body without ANAFs. The wall thickness of the tested flowmeter without ANAFs was equal to the minimum wall thickness of the tested flowmeter with ANAFs.

While various illustrations are provided herein with cross-hatching depicting specific material types, such as metal, rubber, plastic, for example, it will be appreciated that such illustrations are for discussion purposes only and are not intended to limit the scope of the invention, the scope being consistent with the accompanying description and appended claims.

While various illustrations are provided herein depicting acoustic noise attenuating features 314, 314.1, 314.2, 414, 414', 714, 814, 914, 914.1, 914.2 arranged on respective one-piece conduits with substantially uniform spacing "w" between adjacent ones of such features (see FIG. 5 for example), it will be appreciated that the scope of the invention is not so limited and also encompasses a non-uniform spacing between adjacent acoustic noise attenuating features.

While certain arrangements and/or combinations of acoustic noise attenuating features have been described and illustrated herein, it will be appreciated that these certain combinations are for illustration purposes only and that any combination of any of the various acoustic noise attenuating features disclosed herein may be employed in accordance with an embodiment of the invention. Any and all such combinations are contemplated herein and are considered within the scope of the invention disclosed.

While certain combinations of features relating to an ultrasonic flowmeter have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed. For example, FIGS. 4, 5, 7-18, 21 and 22 depict acoustic noise attenuating features only on an outer surface of a respective conduit, while FIGS. 6, 19 and 20 depict acoustic noise attenuating features on both outer and inner surfaces of a respective conduit. In view of all that is disclosed herein, it will be appreciated that any of the foregoing acoustic noise attenuating features may be integrally formed on an outer surface, an inner surface, or both outer and inner surfaces of a respective conduit in accordance with an embodiment of the invention disclosed herein.

Figure 24:
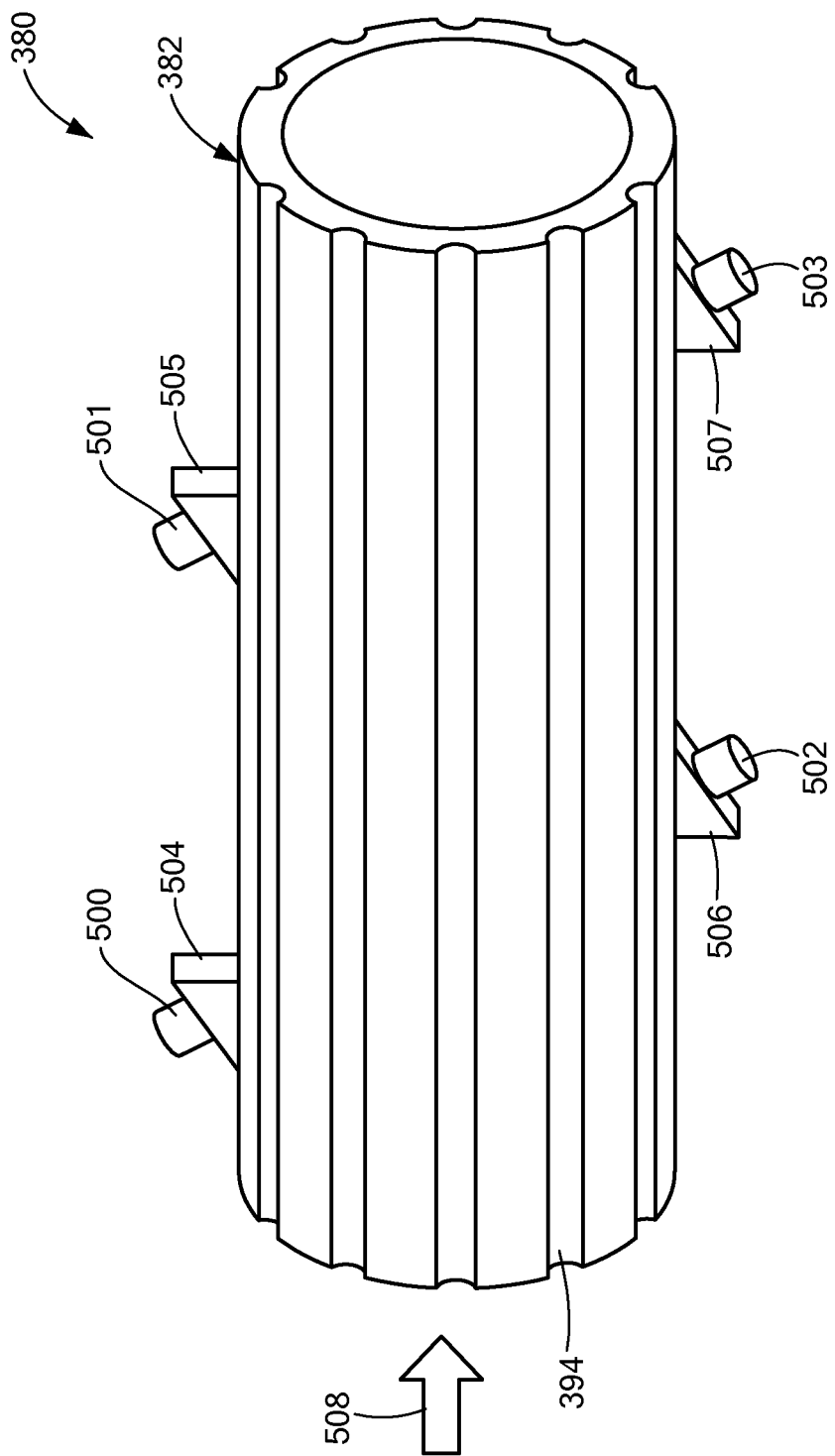
FIG. 24 depicts a type-1 flowmeter similar to that of FIG. 4 but with multiple pairs of transducers in accordance with an embodiment of the invention.
Figure 25:
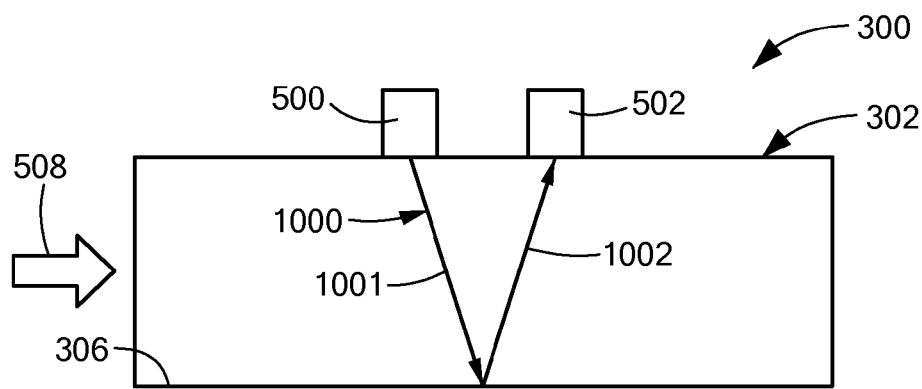
FIGS. 25-29 each depict a type-1 flowmeter similar to that of FIG. 4 but with transducers arranged alternative to the arrangement depicted in FIG. 4 in accordance with an embodiment of the invention.
Figure 26:
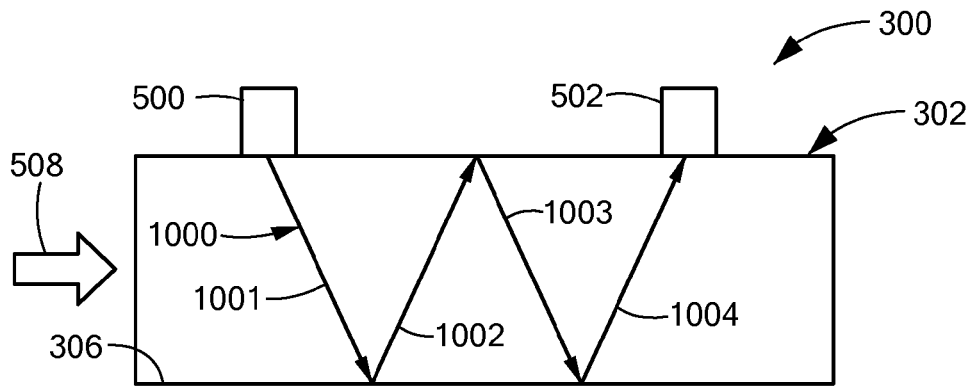

While embodiments of the invention are herein described and illustrated having only two ultrasonic transducers, such as a first transducer and a second transducer where the first transducer is disposed upstream of the second transducer (see FIG. 4 for example), it will be appreciated that the scope of the invention is not so limited and also encompasses, with reference now to FIG. 24, a flowmeter 380 having a one-piece conduit 382 with integrally arranged acoustic noise attenuating features 394, and being equipped with multiple pairs of upstream/downstream transducers 500, 502 and 501, 503 mounted on respective mounting blocks 504, 506 and 505, 507, where the transducers 500, 502, 501, 503 are arranged relative to the integrally formed acoustic noise attenuating features 394 in a manner herein disclosed. While FIG. 24 depicts only two pairs of transducers 500, 502 and 501, 503, it will be appreciated that this is for illustration purposes only, and that any number of pairs of transducers, such as 3, 4, 5 or more pairs of transducers may be employed and still fall within the scope of the invention disclosed herein.

Figure 27:
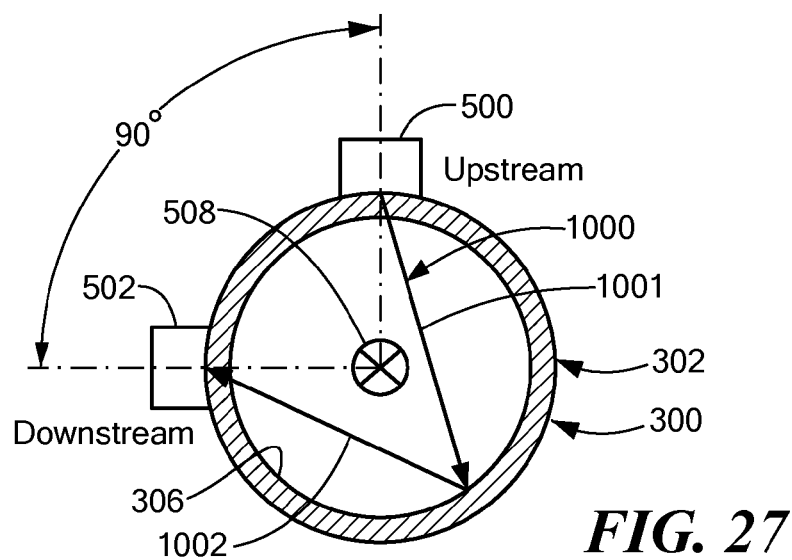
Figure 28:
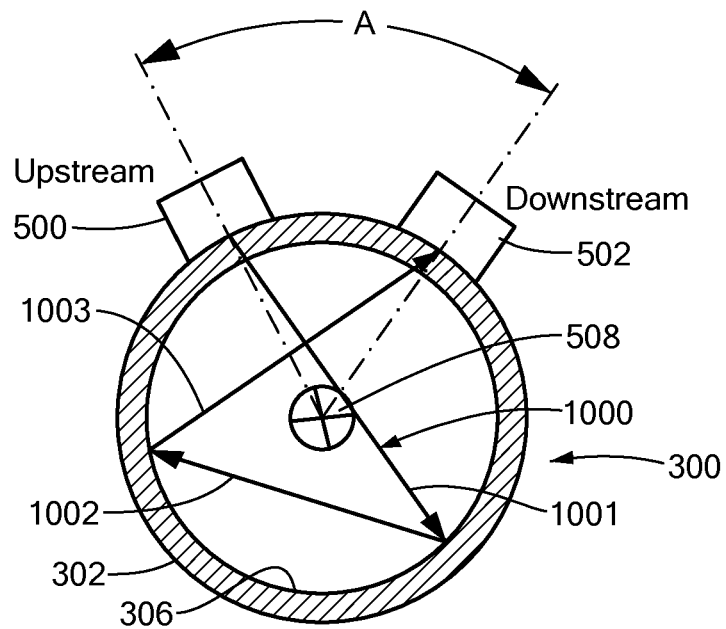
Figure 29:
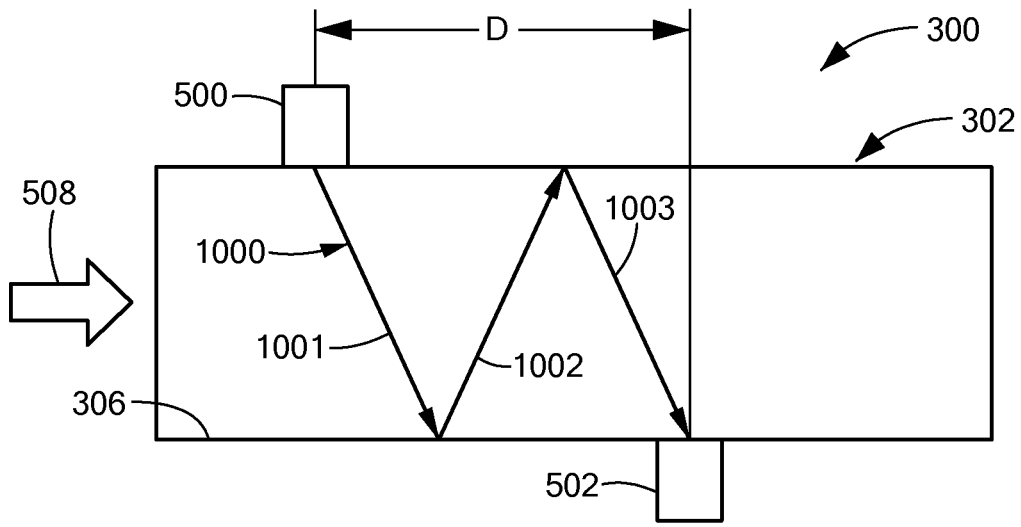

As discussed above, and with reference now to FIGS. 25-29 depicting block diagram schematics of a type-1 flowmeter 300 having a one-piece conduit 302 similar to that depicted in FIG. 4, transducers 500, 502 may be disposed on a same side of the flowmeter body 302 as depicted in FIGS. 25 and 26, may be disposed orthogonal to each other on a side of the flowmeter body 302 as depicted in FIG. 27, disposed at an angle "A" other than 180-degrees or 90-degrees relative to each other on a side of the flowmeter body 302 as depicted in FIG. 28, or may be disposed on opposite sides of the flowmeter body 302 at a distance "D" so that the receiving transducer 502 receives a reflected acoustic wave 1003 as depicted in FIG. 29. With reference to FIGS. 25-29 collectively, reference numeral 1000 represents the acoustic wave that propagates in the fluid in the one-piece conduit 302 from the transmitting transducer 500, which is the upstream transducer in the illustrated embodiments, to the receiving transducer 502, which is the downstream transducer in the illustrated embodiments, reference numeral 1001 represents the injected signal from the transmitting transducer 500, and reference numerals 1002, 1003 and 1004 represent signals reflected by the interior surface 306 of the one-piece conduit 302. As illustrated in FIGS. 25-29, the transducers 500, 502 are arranged so that they inject an ultrasonic signal 1001 at an angle relative to the body of the one-piece conduit 302, and the interior surface 306 of the one-piece conduit 302 is used to reflect the ultrasonic signal so that the signal propagates toward and is properly received by the receiving transducer 502, as depicted by reflected signals 1002, 1003 and 1004. The direction of fluid flow in FIGS. 25-29 is represented by reference numeral 508, where a circle-X graphic (as depicted in FIGS. 27 and 28) represents fluid flow into the plane of the paper. All such configurations of flowmeters employing acoustic noise attenuating features as herein disclosed are contemplated and considered to be within the scope of the invention disclosed herein.

Figure 30:
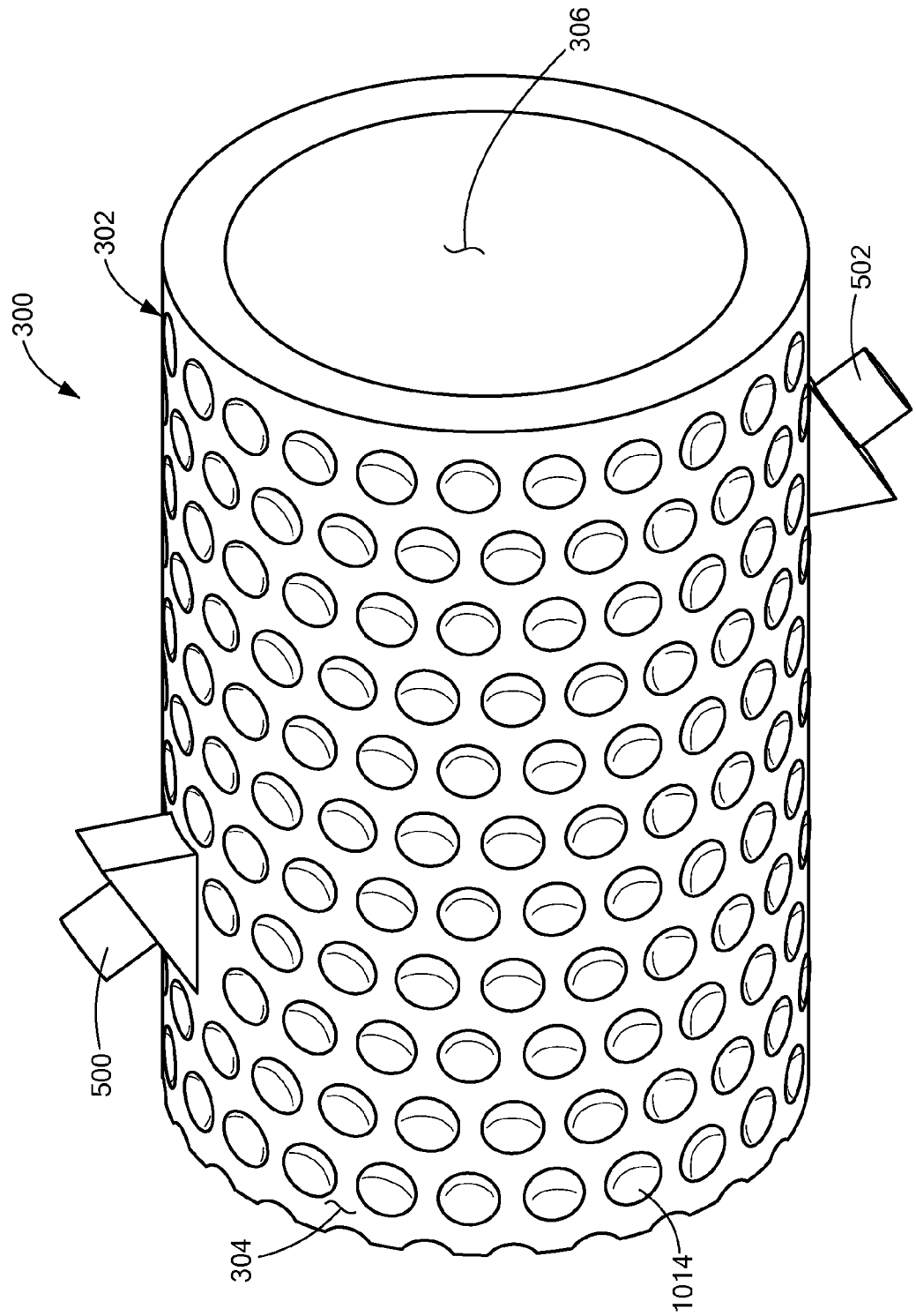
FIGS. 30-33 each depict a type-1 flowmeter similar to that of FIG. 4 but with an alternative arrangement of acoustic noise attenuating features in accordance with an embodiment of the invention.
Figure 31:
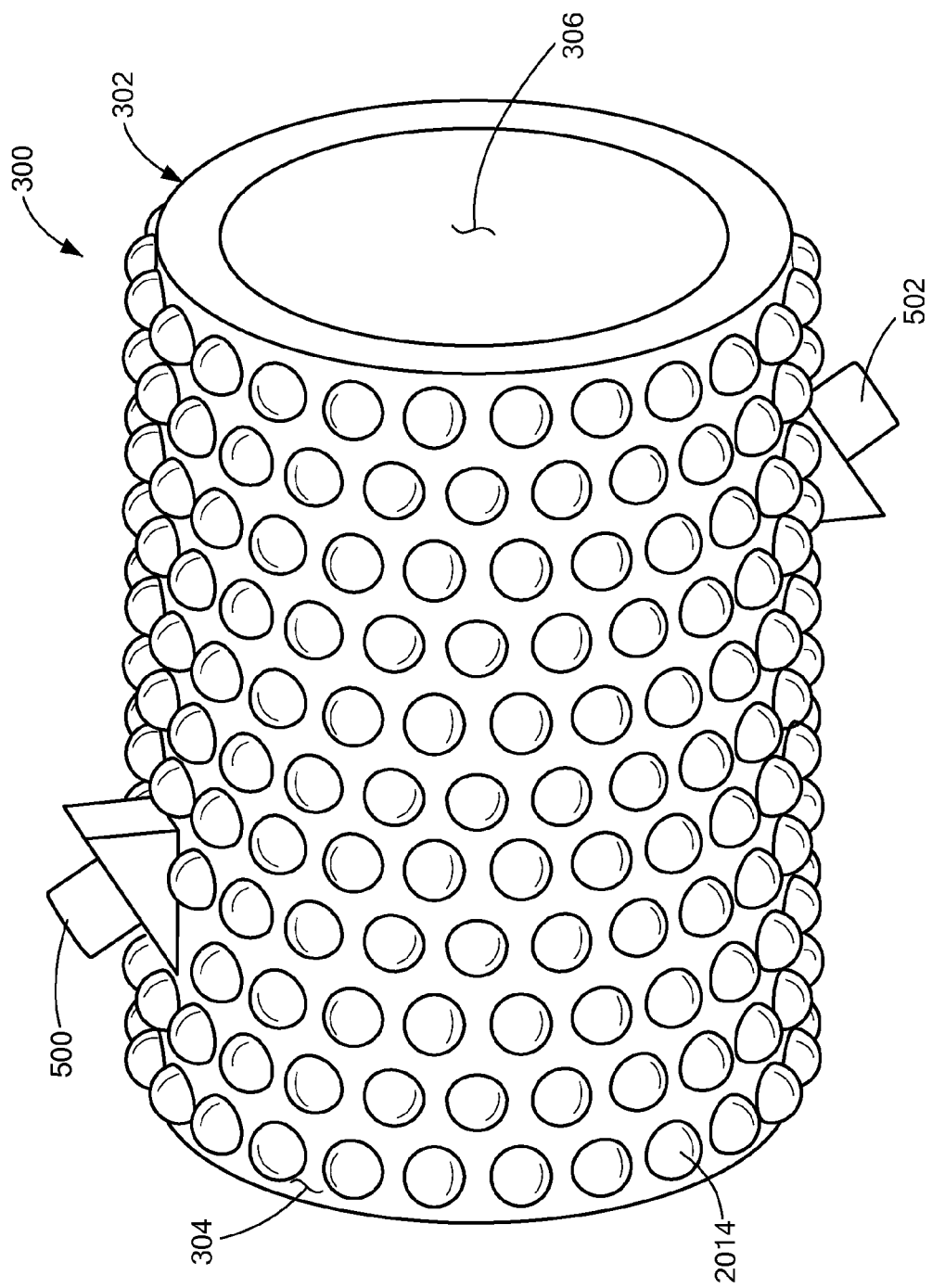

With reference now to FIGS. 30 and 31 depicting a type-2 flowmeter 300 having a one-piece conduit 302 and transducers 500, 502 similar to that depicted in FIG. 4, other acoustic noise attenuating features contemplated being suitable for a purpose disclosed herein include a plurality of separate and distinct recesses, pockets or dimples 1014 formed in a surface, exterior surface 304 as illustrated, or interior surface 306 as herein described, of the one-piece conduit 302, and/or a plurality of separate and distinct protrusions 2014 that extend outward from a surface, exterior surface 304 as illustrated, or interior surface 306 as herein described, of the one-piece conduit 302. As used herein, the term separate and distinct as it is applied to acoustic noise attenuating features means that the acoustic noise attenuating features are formed by discrete regions of surface discontinuities, rather than by elongated regions of surface discontinuities as illustrated and described in connection with FIGS. 4 and 5 for example. While FIGS. 30 and 31 illustrate pockets 1014 and protrusions 2014 separately, it will be appreciated that the pockets 1014 and protrusions 2014 could be combined on a single one-piece conduit 302. While FIGS. 30 and 31 illustrate pockets 1014 and protrusions 2014 arranged in a generally uniform manner with uniform spacing therebetween, it will be appreciated that the scope of the invention is not so limited and also encompasses pockets 1014 and protrusions 2014 arranged in a random manner. All such configurations of flowmeters employing acoustic noise attenuating features as herein disclosed are contemplated and considered to be within the scope of the invention disclosed herein.

Figure 32:
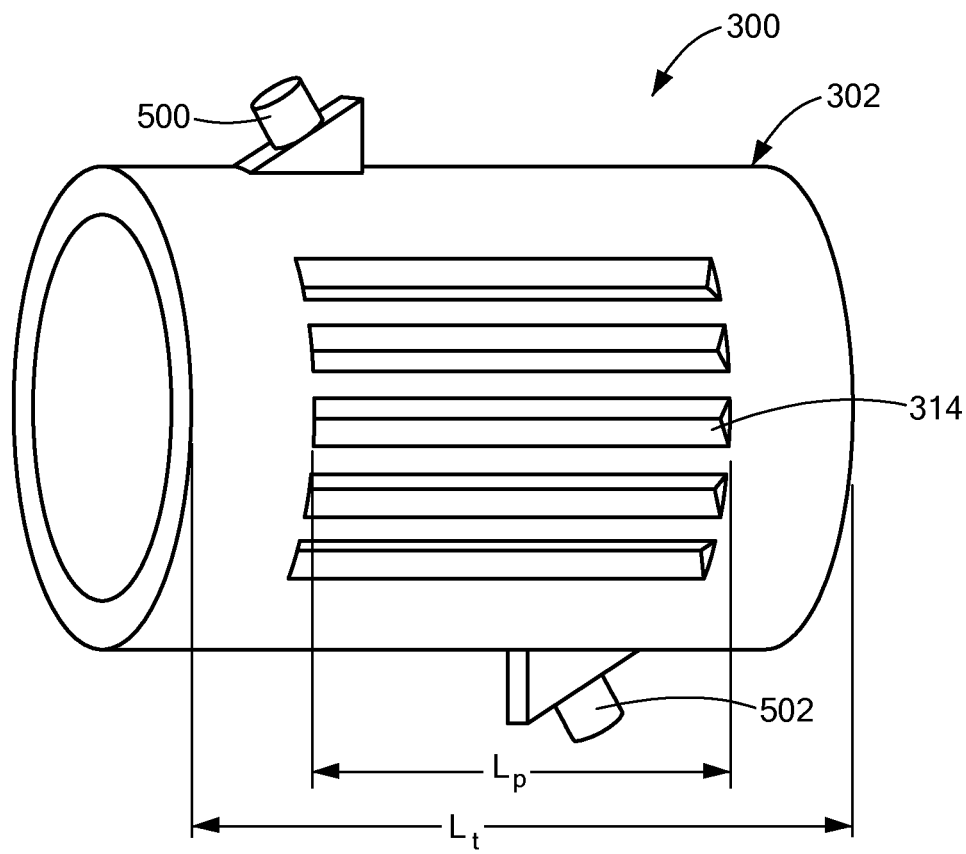
Figure 33:
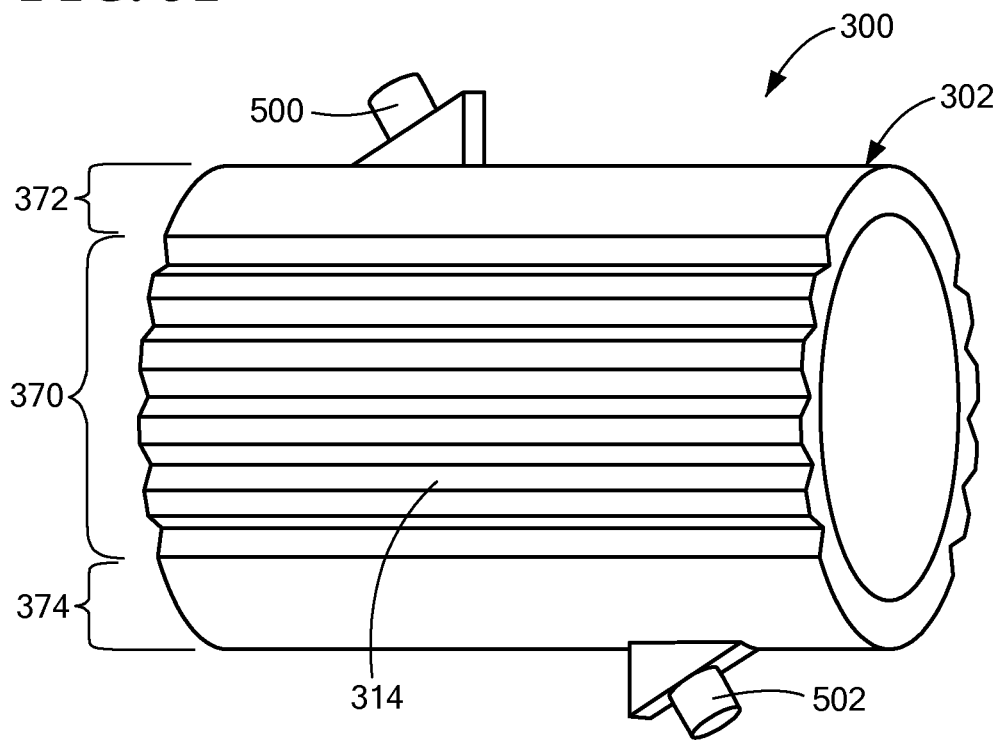

From all of the foregoing, and with reference now to FIGS. 32 and 33, it will be appreciated that the acoustic noise attenuating features disclosed herein need not extend the full length of the one-piece conduit 302 (as depicted in FIG. 4 for example), and need not be distributed around the entire circumference of the one-piece conduit 302 (as depicted in FIG. 6 for example). Alternatively, acoustic noise attenuating features 314 may extend only a partial length "Lp" of the total length "Lt" of the one-piece conduit 302, as depicted in FIG. 32, and may be disposed on side portions 370 of the one-piece conduit 302 between the transducers 500, 502, but not on the top and bottom portions 372, 374 of the one-piece conduit 302, as depicted in FIG. 33. All such configurations of flowmeters employing acoustic noise attenuating features as herein disclosed are contemplated and considered to be within the scope of the invention disclosed herein.

As disclosed, some embodiments of the invention may include some of the following advantages: a flowmeter having a one-piece conduit with integrally formed acoustic noise attenuating features that provide a more effective means to measure flow characteristics using ultrasonic techniques by reducing the parasitic acoustic noise propagating through the flowmeter conduit wall and therefore improving the SNR of the ultrasonic signals transmitted through the fluid; and, a one-piece conduit with integrally formed acoustic noise attenuating features absent a discontinuous boundary layer between the fluid conduit and the acoustic noise attenuating features, thereby eliminating the possibility of deflecting acoustic waves back into the conduit wall that could otherwise occur in the presence of a discontinuous boundary layer, thereby improving the overall efficiency of the acoustic noise attenuating features.

In view of all of the foregoing, it will be appreciated that the particular and innovative arrangement of components according to the invention disclosed herein not only affords numerous not insignificant technical advantages over known art, but also provides an entirely novel and attractive visual appearance in a compact design.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A flowmeter, comprising:
a one-piece conduit having an outer surface and an inner surface that define a wall thickness therebetween;
a first transducer and a second transducer, each transducer being disposed external of or integral with the one-piece conduit, in signal communication with an interior volume of the one-piece conduit, and relative to each other such that each transducer can send and receive an acoustic signal to the other transducer; and
wherein the one-piece conduit comprises a plurality of acoustic noise attenuating features integrally formed with at least one of the outer surface and the inner surface and disposed between the first and second transducers, each of the features being configured and oriented to disturb a propagation direction of a parasitic acoustic wave that will propagate in the wall of the one-piece conduit in response to activation of at least one of the transducers.

2. The flowmeter of claim 1, wherein:
the cross-sectional wall thickness of the one-piece conduit varies between the first transducer and the second transducer to form a plurality of discontinuous boundaries in the wall of the one-piece conduit, the acoustic noise attenuating features being defined by the plurality of discontinuous boundaries.

3. The flowmeter of claim 2, wherein:
the plurality of discontinuous boundaries are defined by elongated regions of surface discontinuities, discrete regions of surface discontinuities, or a combination of both elongated and discrete regions of surface discontinuities.

4. The flowmeter of claim 3, wherein:
the elongated regions of surface discontinuities comprises elongated channels, elongated projections, or a combination of elongated channels and elongated projections.

5. The flowmeter of claim 3, wherein:
the discrete regions of surface discontinuities comprises separate and distinct recesses, separate and distinct protrusions, or a combination of separate and distinct recesses and protrusions.

6. The flowmeter of claim 4, wherein:
the elongated regions of surface discontinuities are uniformly spaced with respect to each other.

7. The flowmeter of claim 4, wherein:
the elongated regions of surface discontinuities extend in a generally axial direction with respect to a central axis of the one-piece conduit, and extend only partially along a length of the one-piece conduit.

8. The flowmeter of claim 4, wherein:
the elongated regions of surface discontinuities extend in a generally axial direction with respect to a central axis of the one-piece conduit, are disposed only on side portions of the one-piece conduit.

9. The flowmeter of claim 5, wherein:
the discrete regions of surface discontinuities are uniformly spaced with respect to each other.

10. The flowmeter of claim 4, wherein:
the plurality of discontinuous boundaries are defined by semi-circular channels, semi-circular projections, rectangular channels, rectangular projections, triangular channels, triangular projections, trapezoidal channels, trapezoidal projections, polygon-shaped channels, polygon-shaped projections, curved channels, curved projections, or any combination of the foregoing discontinuous boundaries.

11. The flowmeter of claim 2, wherein:
a ratio of the minimum cross-sectional wall thickness to the maximum cross-sectional wall thickness of the one-piece conduit has a range from around 0.1 to around 0.9.

12. The flowmeter of claim 2, wherein:
the plurality of acoustic noise attenuating features have a depth relative to at least one of an outer surface or an inner surface of the one-piece conduit, the one-piece conduit having a nominal wall thickness, the ratio of the depth to the nominal wall thickness having a range from around 0.1 to around 0.9.

13. The flowmeter of claim 2, wherein:
the plurality of acoustic noise attenuating features have a height relative to at least one of an outer surface or an inner surface of the one-piece conduit, the one-piece conduit having a nominal wall thickness, the ratio of the height to the nominal wall thickness having a range from around 0.1 to around 0.9.

14. The flowmeter of claim 2, wherein:
the first and second transducers are each disposed in signal communication with the one-piece conduit, with the first transducer being disposed upstream of the second transducer; and
the plurality of discontinuous boundaries are oriented parallel with a longitudinal axis of the one-piece conduit, helical about the longitudinal axis of the one-piece conduit, at an angle relative to the longitudinal axis of the one-piece conduit, curved in a direction parallel to the longitudinal axis of the one-piece conduit, or any combination of the foregoing orientations.

15. The flowmeter of claim 2, wherein:
the first and second transducers are disposed at opposite ends of the one-piece conduit; and
the plurality of discontinuous boundaries are oriented perpendicular with a longitudinal axis of the one-piece conduit, helical about the longitudinal axis of the one-piece conduit, at an angle relative to the longitudinal axis of the one-piece conduit, curved in a direction perpendicular to the longitudinal axis of the one-piece conduit, or any combination of the foregoing orientations.

16. The flowmeter of claim 1, wherein:
each of the first and second transducers are ultrasonic transducers.

17. The flowmeter of claim 4, wherein the plurality of discontinuous boundaries form a plurality of pockets having a depth relative to at least one of the outer surface and the inner surface, and further comprising:
a filler material disposed within the plurality of pockets, the filler material being acoustically different from the material of the one-piece conduit.

18. The flowmeter of claim 17, wherein:
The filler material comprises an acoustic damping material comprising a thermoplastic, a polymer, a rubber, an epoxy, an elastomeric material, a viscoelastic material, or any combination of the foregoing damping materials.

19. The flowmeter of claim 1, wherein:
the wall thickness of the one-piece conduit varies between the first transducer and the second transducer to form a plurality of discontinuous boundaries in the wall of the one-piece conduit, the acoustic noise attenuating features being defined by the plurality of discontinuous boundaries;
the plurality of discontinuous boundaries are defined by channels, projections or a combination of channels and projections;
a ratio of the minimum cross-sectional wall thickness to the maximum cross-sectional wall thickness of the one-piece conduit ranges from around 0.1 to around 0.9; and
each of the first and second transducers are ultrasonic transducers.

20. The flowmeter of claim 19, wherein:
the first and second transducers are each disposed in signal communication with the outer surface of and on opposite sides of the one-piece conduit, with the first transducer being disposed upstream of the second transducer; and
the plurality of discontinuous boundaries are oriented parallel with a longitudinal axis of the one-piece conduit, helical about the longitudinal axis of the one-piece conduit, at an angle relative to the longitudinal axis of the one-piece conduit, curved in a direction parallel to the longitudinal axis of the one-piece conduit, or any combination of the foregoing orientations.

21. The flowmeter of claim 19, wherein:
the first and second transducers are disposed at opposite ends of the one-piece conduit; and
the plurality of discontinuous boundaries are oriented perpendicular with a longitudinal axis of the one-piece conduit, helical about the longitudinal axis of the one-piece conduit, at an angle relative to the longitudinal axis of the one-piece conduit, curved in a direction perpendicular to the longitudinal axis of the one-piece conduit, or any combination of the foregoing orientations.

22. The flowmeter of claim 20, made by the process of:
forming the one-piece conduit from a material having an uninterrupted material path from the outer surface to the inner surface; and acoustically fitting the first and second transducers to the outer surface of or integral with the outer surface of the one-piece conduit.

23. The flowmeter of claim 22, wherein the material of the one-piece conduit comprises metal, and the forming comprises:
forming the one-piece conduit with the integrally formed plurality of acoustic noise attenuating features via a machining, forging, casting, extruding, or pultruding process.

24. The flowmeter of claim 23, wherein the forming further comprises:
providing a first conduit absent the plurality of acoustic noise attenuating features; and
machining the plurality of acoustic noise attenuating features into the outer surface of the first conduit to form the one-piece conduit having the plurality of acoustic noise attenuating features.

25. The flowmeter of claim 22, wherein the material of the one-piece conduit comprises a thermoplastic, a polymer, a rubber, an epoxy, an elastomeric material, a viscoelastic material, or any combination of the foregoing damping materials, and the forming comprises:
forming the one-piece conduit with the integrally formed plurality of acoustic noise attenuating features via a molding, extruding, pultruding, or machining process.

26. The flowmeter of claim 21, made by the process of:
forming the one-piece conduit from a material having an uninterrupted material path from the outer surface to the inner surface; and
acoustically fitting the first and second transducers to respective ends of the one-piece conduit.

27. The flowmeter of claim 26, wherein the material of the one-piece conduit comprises metal, and the forming comprises:
forming the one-piece conduit with the integrally formed plurality of acoustic noise attenuating features via a machining, forging, casting, extruding, or pultruding process.

28. The flowmeter of claim 27, wherein the forming further comprises:
providing a first conduit absent the plurality of acoustic noise attenuating features; and
machining the plurality of acoustic noise attenuating features into the outer surface of the first conduit to form the one-piece conduit having the acoustic noise attenuating features.

29. The flowmeter of claim 26, wherein the material of the one-piece conduit comprises a thermoplastic, a polymer, a rubber, an epoxy, an elastomeric material, a viscoelastic material, or any combination of the foregoing damping materials, and the forming comprises:
forming the one-piece conduit with the integrally formed plurality of acoustic noise attenuating features via a molding, blow-molding, extruding, pultruding, or machining process.

30. The flowmeter of claim 1, further comprising:
a third transducer and a fourth transducer, each of the third and fourth transducers being disposed external of or integral with the one-piece conduit, in signal communication with the interior volume of the one-piece conduit, and relative to each other such that each of the third and fourth transducers can send and receive an acoustic signal to the other of the third and fourth transducers; and
wherein the plurality of acoustic noise attenuating features are disposed between the third and fourth transducers.

31. The flowmeter of claim 1, wherein:
at least one of the first transducer and the second transducer is integrally arranged with the one-piece conduit.

32. The flowmeter of claim 31, wherein the at least one of the first transducer and the second transducer integrally arranged with the one-piece conduit comprises:
a weld, a molded-in coupling, an adhesive, a threaded coupling, or a spring bias arrangement that serves to maintain an acoustic coupling between at least one of the first and second transducers and the one-piece conduit.

33. The flowmeter of claim 32, wherein at least one of the first transducer and the second transducer are fitted to the one-piece conduit in a wetted transducer arrangement.

34. The flowmeter of claim 32, wherein at least one of the first transducer and the second transducer are fitted to the one-piece conduit in a non-wetted transducer arrangement.

35. The flowmeter of claim 14, wherein:
the first and second transducers are disposed on the outer surface of and on opposite sides of the one-piece conduit.

36. The flowmeter of claim 14, wherein:
the first and second transducers are disposed on the outer surface of and on a same side of the one-piece conduit.

37. The flowmeter of claim 14, wherein:
the first and second transducers are disposed on the outer surface of and orthogonal to each other.

38. The flowmeter of claim 14, wherein:
the first and second transducers are disposed on the outer surface of and at an angle other than 90-degrees or 180-degrees relative to each other.

* * * * *